(12) United States Patent
Lee et al.

(10) Patent No.: US 10,516,208 B2
(45) Date of Patent: Dec. 24, 2019

(54) ELECTRONIC DEVICE INCLUDING SHIELDING STRUCTURE

(71) Applicant: SAMSUNG ELECTRONICS CO., LTD., Suwon-si, Gyeonggi-do (KR)

(72) Inventors: Woo-Sup Lee, Suwon-si (KR); Youn-Ju Kim, Suwon-si (KR); Kyeong-Jo Keum, Suwon-si (KR); Jung-Sik Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 83 days.

(21) Appl. No.: 15/648,794

(22) Filed: Jul. 13, 2017

(65) Prior Publication Data

US 2018/0040950 A1 Feb. 8, 2018

(30) Foreign Application Priority Data

Aug. 4, 2016 (KR) ........................ 10-2016-0099482

(51) Int. Cl.
*H01Q 1/52* (2006.01)
*H04B 5/00* (2006.01)
(Continued)

(52) U.S. Cl.
CPC ....... *H01Q 1/526* (2013.01); *G06K 19/07779* (2013.01); *H04B 5/0031* (2013.01); *H04B 5/0087* (2013.01); *H04B 5/02* (2013.01)

(58) Field of Classification Search
CPC .............................. H01Q 1/526; H01Q 1/40; H01Q 1/38; H01Q 7/00; H01Q 7/06; H01Q 1/243;
(Continued)

(56) References Cited

U.S. PATENT DOCUMENTS

2003/0107523 A1 6/2003 Yahata et al.
2014/0002305 A1* 1/2014 Hsu ........................ H01Q 1/245
342/368
(Continued)

FOREIGN PATENT DOCUMENTS

EP 3 048 666 7/2016
JP 2007-306287 11/2007
(Continued)

OTHER PUBLICATIONS

International Search Report dated Oct. 23, 2017 in counterpart International Patent Application No. PCT/KR2017/007529.
(Continued)

*Primary Examiner* — Jianxun Yang
(74) *Attorney, Agent, or Firm* — Nixon & Vanderhye P.C.

(57) ABSTRACT

An electronic device, of the present disclosure, may include: a housing; an antenna unit disposed inside the housing and including a conductive pattern configured to generate a magnetic field; a plate comprising at least a part of the housing and including a material through which at least a part of the magnetic field generated by the conductive pattern can pass; and a control circuit configured to transmit at least one piece of payment information to an external device using the conductive pattern, wherein the antenna unit including the conductive pattern includes: a first coil having a first plurality of turns that is substantially perpendicular to one surface of the plate; and a second coil having a second plurality of turns that is substantially parallel to the surface of the plate, and a shielding structure comprising a shielding material is disposed inside the first coil or below the second coil. The electronic device, according to various example embodiments of the present disclosure, can implement various read-out methods (for example, a Near Field Communication (NFC) method and a Magnetic Secure
(Continued)

Transmission (MST) method) with one module due to the shape of the shielding structure disposed in the antenna unit.

16 Claims, 25 Drawing Sheets

(51) Int. Cl.
*H04B 5/02* (2006.01)
*G06K 19/077* (2006.01)

(58) Field of Classification Search
CPC ........ H01Q 1/245; H01Q 1/52; H04B 5/0031; H04B 5/0087; H04B 5/02; H04B 5/0081; H02J 5/005; H02J 50/90; H02J 7/025; G06K 19/06206
See application file for complete search history.

(56) References Cited

U.S. PATENT DOCUMENTS

| | | | |
|---|---|---|---|
| 2014/0035793 A1* | 2/2014 | Kato | H01Q 1/243 343/867 |
| 2014/0138447 A1* | 5/2014 | Goldman | G06K 19/06206 235/492 |
| 2014/0253404 A1* | 9/2014 | Ikemoto | H01Q 1/40 343/788 |
| 2014/0375262 A1* | 12/2014 | Yamaguchi | H02J 50/90 320/108 |
| 2015/0064100 A1 | 3/2015 | Derecskei et al. | |
| 2017/0005399 A1 | 1/2017 | Ito et al. | |

FOREIGN PATENT DOCUMENTS

| | | |
|---|---|---|
| JP | 2014-183469 | 9/2014 |
| KR | 10-2016-0090235 | 7/2016 |
| WO | 2015/147133 | 10/2015 |

OTHER PUBLICATIONS

Extended Search Report dated Nov. 27, 2017 in counterpart European Patent Application No. 17182136.6.

* cited by examiner

ELECTRONIC DEVICE INCLUDING SHIELDING STRUCTURE

CROSS-REFERENCE TO RELATED APPLICATION

This application is based on and claims priority under 35 U.S.C. § 119 to Korean Application Serial No. 10-2016-0099482, which was filed in the Korean Intellectual Property Office on Aug. 4, 2016, the content of which is incorporated by reference herein in its entirety.

TECHNICAL FIELD

The present disclosure relates generally to an electronic device. For example, the present disclosure relates to an electronic device including a shielding structure that has an improved credit-card payment function.

BACKGROUND

Conventional payment methods, such as cash payment, credit card payment, account transfer, and the like, have been used in on/off-line commerce. In on-line e-commerce, credit card payment may be used through account transfer, user authentication, or the like. In off-line commerce, credit card payment may be performed by a point of sale (POS) reader reading a contact or non-contact type credit card. Examples of a credit card include a magnetic stripe card, an integrated circuit (IC) card, and the like, and an IC card with excellent security is now widely used.

In recent years, user authentication information loaded in an electronic device (for example, a portable terminal) has been used for on/off-line payment. For example, a user can utilize an electronic device loaded with credit card information as a credit card without carrying a separate credit card. In a case where an electronic device has a credit card function, payment may be made through a near field communication (NFC) method, a method of reading a bar code output on a screen, or a magnetic secure transmission (MST) method.

A conventional coil antenna has a structure to transfer credit card information to a reader through a coil by means of one of an MST method and an NFC method. The MST and NFC methods cannot be simultaneously applied since the MST and NFC methods use different types of coils. These method each have advantages and disadvantages.

SUMMARY

In a complex shielding-material coil antenna structure according to an example embodiment of the present disclosure, a shielding sheet capable of being applied to various coil arrangement methods is implemented so that an MST or NFC method can be selectively used in one module.

An electronic device, according to an example embodiment of the present disclosure, includes: a housing; an antenna unit comprising at least one coil disposed inside the housing and including a conductive pattern configured to generate a magnetic field; a plate comprising at least a part of the housing and including a material through which at least a part of the magnetic field generated by the conductive pattern passes; and a control circuit configured to transmit at least one piece of payment information to an external device using the conductive pattern, wherein the antenna unit including the conductive pattern may include: a first coil having a first plurality of turns that passes through the antenna unit in directions substantially perpendicular to one surface of the plate; and a second coil having a second plurality of turns that is substantially parallel to the surface of the plate, and a shielding structure comprising a shielding material may be disposed inside the first coil or below the second coil.

According to an example embodiment of the present disclosure, the first coil having the plurality of turns may be wound around a first axis in a first direction, and the second coil having the plurality of turns may be wound around a second axis in a second direction, is the second axis being different from the first axis.

An electronic device, according to an example embodiment of the present disclosure, includes: a plurality of antenna units comprising a first coil and a second coil; a Magnetic Secure Transmission (MST) module comprising MST circuitry connected to the first coil; a Near Field Communication (NFC) module comprising NFC circuitry connected to the second coil; and a shielding structure comprising a shielding material disposed inside the first coil or below the second coil.

An antenna device, according to an example embodiment of the present disclosure, includes: a substrate; a first coil having a first plurality of turns substantially perpendicular to one surface of the substrate; a second coil having a second plurality of turns substantially parallel to the surface of the substrate; and a shielding structure comprising a shielding material disposed inside the first coil or below the second coil.

The electronic device, according to an example embodiment of the present disclosure, can implement various read-out methods (for example, a Near Field Communication (NFC) method and a Magnetic Secure Transmission (MST) method) with one module due to the shape of the shielding structure disposed in the antenna unit.

The electronic device, according to an example embodiment of the present disclosure, can transmit various patterns of signals capable of selectively using an MST or NFC method in one module so that an external device, such as a POS reader, etc., can easily recognize payment information loaded in the electronic device.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numbers refer to like elements, and wherein.

DETAILED DESCRIPTION

Figure 1:
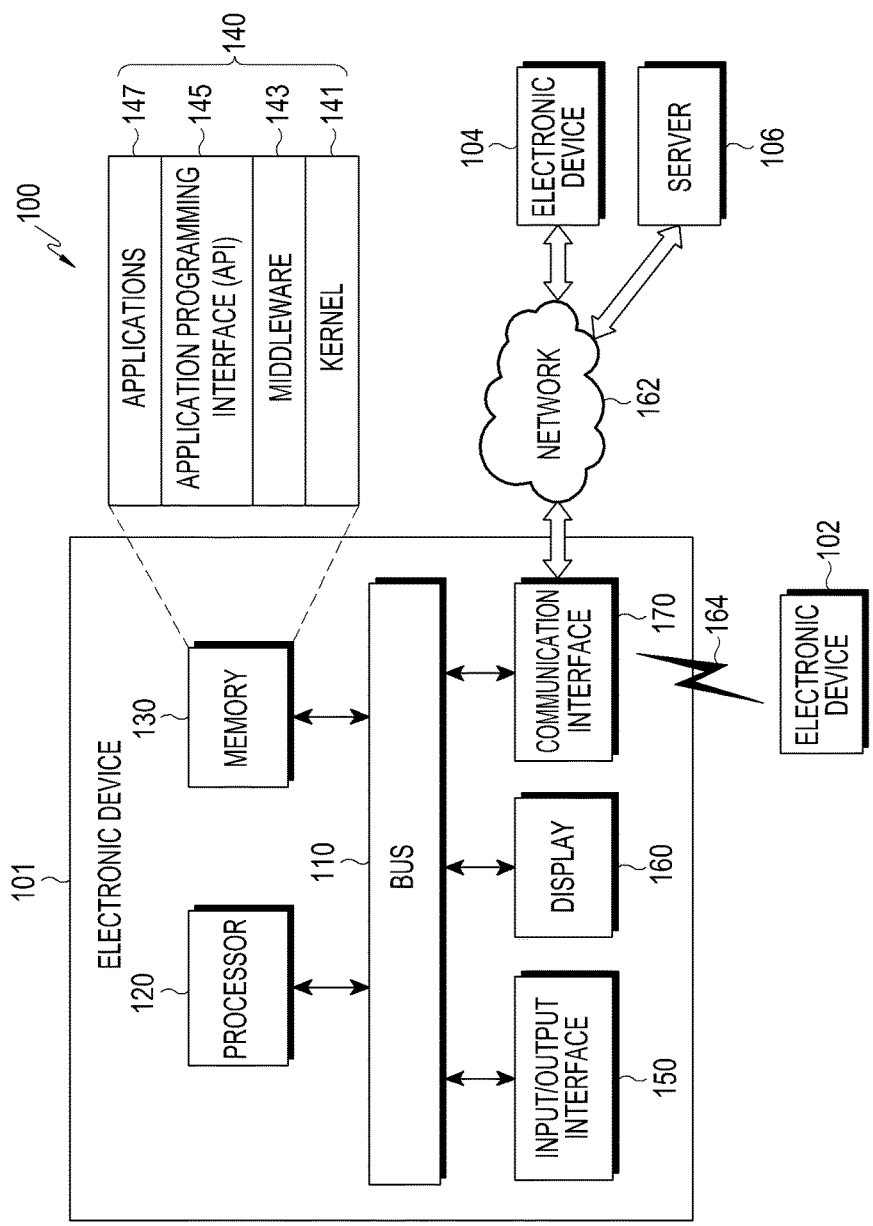
FIG. 1 is a diagram illustrating a network environment including multiple electronic devices, according to various example embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements.

In the various embodiments of the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second," etc. used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. On the other hand, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer to a situation in which the device, together with other devices or components, "is able to". For example, the phrase "processor adapted (or configured) to perform A, B, and C" may refer, for example, to a dedicated processor (e.g., embedded processor) for performing the corresponding operations or a generic-purpose processor (e.g., central processing unit (CPU) or application processor (AP)) that can perform the corresponding operations by executing one or more software programs stored in a memory device.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings of the contextual meanings in the relevant field of art, and are not to be interpreted to have ideal or excessively formal meanings unless clearly defined in the present specification. In some cases, even when terms are defined in this disclosure, they may not be interpreted as excluding embodiments of the present disclosure.

In the present disclosure, an electronic device may be a random device, and the electronic device may be called a terminal, a portable terminal, a mobile terminal, a communication terminal, a portable communication terminal, a portable mobile terminal, a display device, or the like.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), or the like, but is not limited thereto. The electronic device may be implemented as a portable communication terminal which has a wireless communication function and a pocket size. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some embodiments, the electronic device 101 may omit at least one of the elements, or may further include other elements.

The bus 110 may include, for example, a circuit that interconnects the elements 110 to 170 and delivers communication (for example, a control message and/or data) between the elements.

The processor 120 may include various processing circuitry, such as, for example, and without limitation, one or more of a dedicated processor, a Central Processing Unit (CPU), an Application Processor (AP), and a Communication Processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an example embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

For example, the kernel 141 may control or manage system resources (for example, the bus 110, the processor 120, or the memory 130) that are used to execute operations or functions implemented by the other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may serve as, for example, an intermediary to allow the API 145 or the application programs 147 to communicate with the kernel 141 to exchange data.

Furthermore, the middleware 143 may process one or more task requests, which are received from the application programs 147, according to priorities thereof. For example, the middleware 143 may assign, to one or more of the application programs 147, priorities for using the system resources (for example, the bus 110, the processor 120, or the memory 130) of the electronic device 101. For example, the middleware 143 may perform scheduling or load balancing on the one or more task requests by processing the one or more task requests according to the priorities assigned to the one or more application programs.

The API 145 is an interface through which the applications 147 control functions provided by the kernel 141 or the middleware 143, and may include, for example, at least one interface or function (for example, instruction) for file control, window control, image processing, or text control.

The input/output interface 150 may include various input/output circuitry and serve as, for example, an interface that can forward instructions or data, which are input from a user or an external device, to the other element(s) of the electronic device 101. Furthermore, the input/output interface 150 may output instructions or data, which are received from the other element(s) of the electronic device 101, to the user or the external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, or an electronic paper display, or the like, but is not limited thereto. The display 160 may display, for example, various types of contents (for example, text, images, videos, icons, or symbols) to a user. The display 160 may include a touch screen and may receive, for example, a touch, gesture, proximity, or hovering input using an electronic pen or a part of a user's body.

The communication interface 170 may include various communication circuitry and configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106). The communication interface 170 may, for example, be connected via a short-range wireless communication connection 164 to an external electronic device 102.

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UNITS), WiBro (Wireless Broadband), and Global System for Mobile Communications (GSM) as a cellular communication protocol. In addition, the wireless communication may include, for example, short range communication 164. The short range communication 164 may include, for example, at least one of Wi-Fi, Bluetooth, Near Field Communication (NFC), and Global Navigation Satellite System (GNSS). The GNSS may include, for example, at least one of a Global Positioning System (GPS), a Global Navigation Satellite System (Glonass), a Beidou Navigation Satellite System (hereinafter referred to as "Beidou"), and a European Global Satellite-based Navigation System (Galileo) according to a place of usage or a bandwidth. Hereinafter, the "GPS" may be interchangeably used with the "GNSS" in the present disclosure. The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a communication network, such as a computer network (for example, a LAN or a WAN), the Internet, and a telephone network.

The first and second external electronic devices 102 and 104 may be of the same or a different type from the electronic device 101. According to an example embodiment, the server 106 may include a group of one or more servers. According to various embodiments, all or some of the operations executed in the electronic device 101 may be executed in another electronic device or a plurality of electronic devices (for example, the electronic devices 102 and 104 or the server 106). According to an example embodiment, when the electronic device 101 has to perform some functions or services automatically or in response to a request, the electronic device 101 may request another device (for example, the electronic device 102 or 104 or the server 106) to perform at least some functions relating thereto, instead of, or in addition to, performing the functions or services by itself. The other electronic device (for example, the electronic device 102 or 104 or the server 106) may perform the requested functions or the additional functions and may deliver the result to the electronic apparatus 101. The electronic device 101 may provide the received result as it is, or may additionally process the received result to provide the requested functions or services. To this end, for example, cloud computing, distributed computing, or client-server computing technology may be used.

Figure 2:
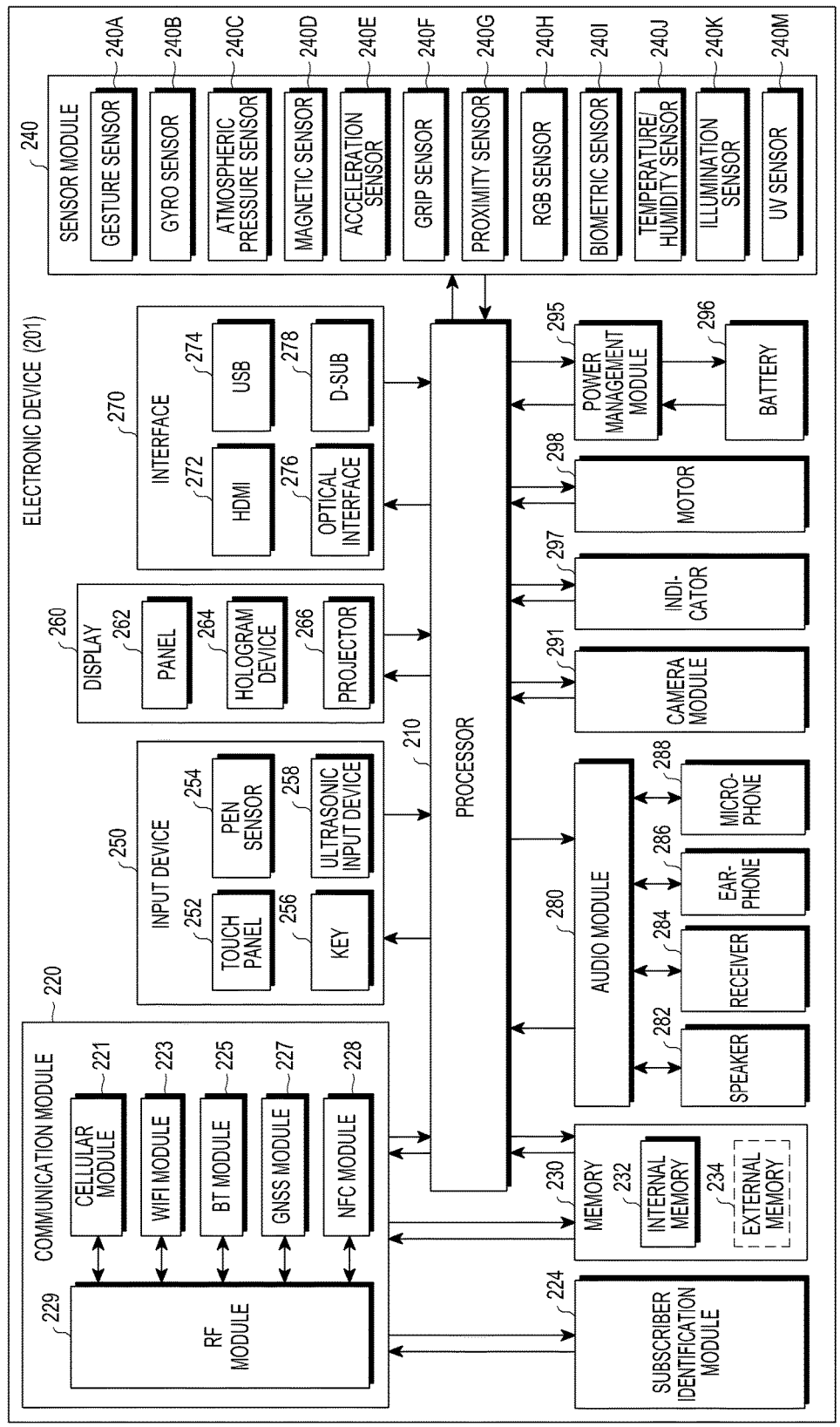
FIG. 2 is a block diagram illustrating an example electronic device according to various example embodiments of the present disclosure.

FIG. 2 is a block diagram illustrating an example electronic device 201 according to various embodiments. The electronic device 201 may include, for example, the entirety or a part of the electronic device 101 illustrated in FIG. 1. The electronic device 201 may include at least one processor (for example, an Application Processor (AP)) (e.g., including processing circuitry 210, a communication module (e.g., including communication circuitry) 220, a subscriber identification module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and drive an operating system or an application program to control a plurality of hardware or software elements connected thereto and to perform various data processing and operations. The processor 210 may be implemented to be, for example, a System on Chip (SoC). According to an example embodiment, the processor 210 may further include a Graphic Processing Unit (GPU) and/or an image signal processor. The processor 210 may also include at least some (for example, a cellular module 221) of the elements illustrated in FIG. 2. The processor 210 may load, in a volatile memory, instructions or data received from at least one of the other elements (for example, a non-volatile memory) to process the loaded instructions or data, and may store various types of data in the non-volatile memory.

The communication module 220 may have a configuration that is the same as, or similar to, that of the communication interface 170 of FIG. 1. The communication module 220 may include various communication circuitry, such as, for example, and without limitation, a cellular module 221, a Wi-Fi module 223, a BT module 225, a GNSS module 227 (for example, a GPS module, a Glonass module, a Beidou module, or a Galileo module), an NFC module 228, and a Radio Frequency (RF) module 229.

The cellular module 221 may provide, for example, a voice call, a video call, a text message service, or an Internet service through a communication network. According to an example embodiment, the cellular module 221 may identify and authenticate the electronic device 201 using the subscriber identification module 224 (for example, a SIM card) within a communication network. According to an example embodiment, the cellular module 221 may perform at least some of the functions that the processor 210 may provide.

According to an example embodiment, the cellular module 221 may include a Communication Processor (CP).

The Wi-Fi module 223, the Bluetooth module 225, the GNSS module 227, or the NFC module 228 may include, for example, a processor for processing data transmitted and received through the corresponding module. According to some embodiments, at least some (for example, two or more) of the cellular module 221, the Wi-Fi module 223, the Bluetooth module 225, the GNSS module 227, and the NFC module 228 may be included in one Integrated Chip (IC) or IC package.

The RF module 229 may transmit and receive, for example, a communication signal (for example, an RF signal). The RF module 229 may include, for example, a transceiver, a Power Amplifier Module (PAM), a frequency filter, a Low Noise Amplifier (LNA), or an antenna. According to another embodiment, at least one of the cellular module 221, the Wi-Fi module 223, the Bluetooth module 225, the GNSS module 227, and the NFC module 228 may transmit and receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 and/or an external memory 234. The internal memory 232 may include, for example, at least one of a volatile memory (for example, a Dynamic Random Access Memory (DRAM), a Static RAM (SRAM), or a Synchronous Dynamic RAM (SDRAM)) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, or a Solid State Drive (SSD)).

The external memory 234 may further include a flash drive, which may be, for example, a Compact Flash (CF), a Secure Digital (SD), a Micro-Secure Digital (Micro-SD), a Mini-Secure Digital (Mini-SD), an extreme Digital (xD), a Multi-Media Card (MMC), or a memory stick. The external memory 234 may be functionally and/or physically connected with the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (for example, a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the AP 210, and may control the sensor module 240 while the AP 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, or a projector 266. The panel 262 may include a configuration that is the same as, or similar to, that of the display 160 illustrated in FIG. 1. The panel 262 may be implemented to be, for example, flexible, transparent, or wearable. The panel 262, together with the touch panel 252, may be configured to be a single module. The hologram device 264 may show a three-dimensional image in the air using interference of light. The projector 266 may display an image by projecting light onto a screen. The screen may be located, for example, inside or outside the electronic device 201. According to an example embodiment, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may convert, for example, a sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, or the microphone 288.

The camera module 291 can photograph a still image and a dynamic image. According to an example embodiment, the camera module 291 may include one or more image sensors (for example, a front sensor or a rear sensor), a lens, an Image Signal Processor (ISP), or a flash (for example, an LED or a xenon lamp).

The power management module 295 may manage, for example, power of the electronic device 201. According to an example embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include a magnetic resonance method, a magnetic induction method, or an electromagnetic wave method. Additional circuits for wireless charging (for example, a coil loop, a resonance circuit, or a rectifier) may be further included. The battery gauge may measure, for example, the residual amount of the battery 296 and a voltage, current, or temperature while charging. The battery 296 may include, for example, a rechargeable battery and/or a solar battery.

The indicator 297 may indicate a particular state (for example, a booting state, a message state, or a charging state) of the electronic device 201 or a part (for example, the processor 210) thereof. The motor 298 may convert an electrical signal into a mechanical vibration and may generate a vibration or a haptic effect. Although not illustrated, the electronic device 201 may include a processing unit (for example, a GPU) for supporting mobile TV. The processing unit for supporting the mobile TV may process media data according to a standard, such as Digital Multimedia Broadcasting (DMB), Digital Video Broadcasting (DVB), or mediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
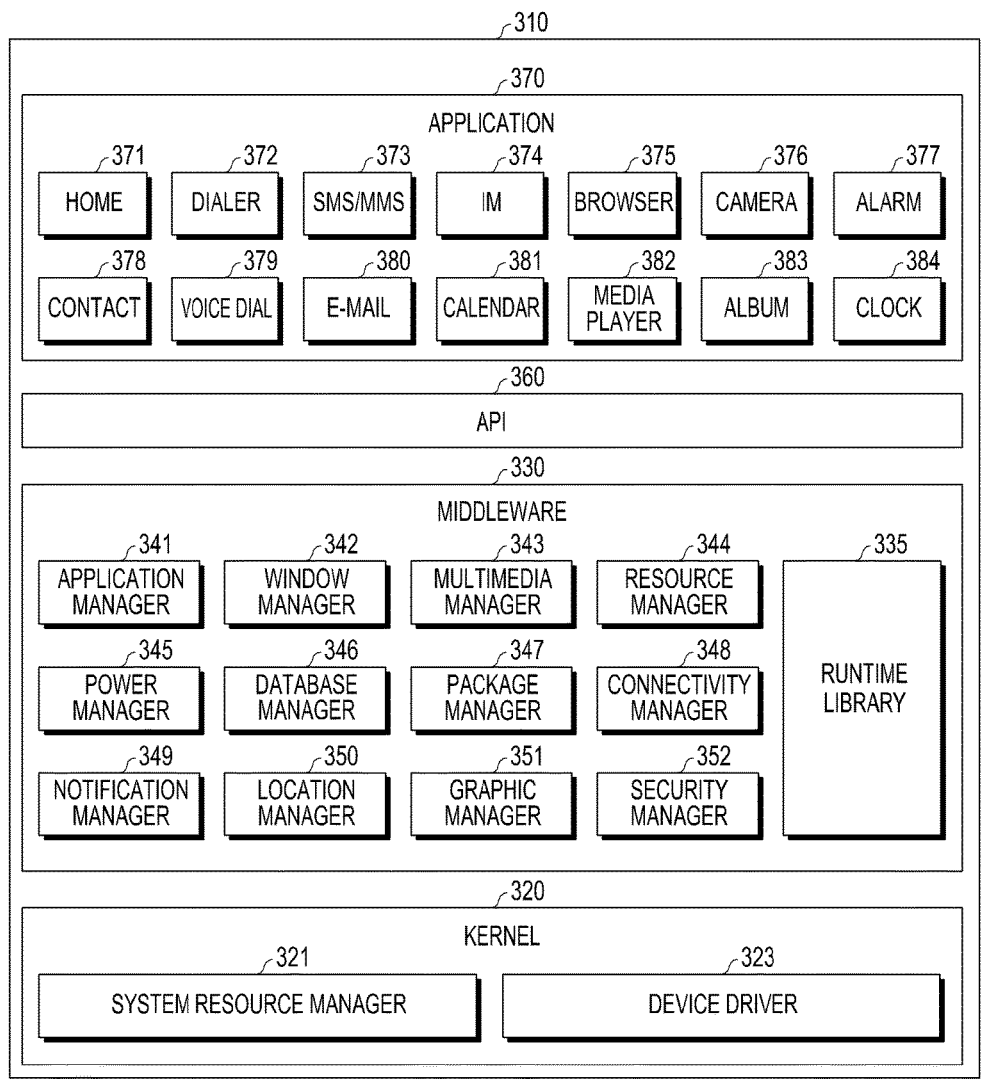
FIG. 3 is a block diagram illustrating an example program module according to various example embodiments.

FIG. 3 is a block diagram illustrating an example program module according to various example embodiments. According to an example embodiment, the program module 310 (for example, the program 140) may include an Operating System (OS) for controlling resources associated with the electronic device (for example, the electronic device 101) and/or various applications (for example, the application programs 147) driven on the operating system. The operating system may be, for example, Android, iOS, Windows, Symbian, Tizen, or Bada.

The program module 310 may include a kernel 320, middleware 330, an Application Programming Interface (API) 360, and/or applications 370. At least a part of the program module 310 may be preloaded on the electronic device, or may be downloaded from an external electronic device (for example, the electronic device 102 or 104, or the server 106).

The kernel 320 (for example, the kernel 141) may include, for example, a system resource manager 321 and/or a device driver 323. The system resource manager 321 may control, allocate, or retrieve system resources. According to an example embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required by the applications 370 in common, or may provide various functions to the applications 370 through the API 360 to enable the applications 370 to efficiently use the limited system resources within the electronic device. According to an example embodiment, the middleware 330

(for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the applications 370 are being executed. The runtime library 335 may perform input/output management, memory management, or functionalities for arithmetic functions.

The application manager 341 may manage, for example, the life cycle of at least one of the applications 370. The window manager 342 may manage GUI resources used for a screen. The multimedia manager 343 may determine formats required to reproduce various media files and may encode or decode a media file using a coder/decoder (codec) appropriate for the corresponding format. The resource manager 344 may manage resources (such as the source code, the memory, or the storage space) of at least one of the applications 370.

The power manager 345 may operate together with a Basic Input/Output System (BIOS) to manage a battery or power, and may provide power information required for the operation of the electronic device. The database manager 346 may generate, search, or change a database to be used by at least one of the applications 370. The package manager 347 may manage the installation or update of an application that is distributed in the form of a package file.

The connectivity manager 348 may manage a wireless connection, such as Wi-Fi or Bluetooth. The notification manager 349 may display or notify of an event (such as an arrival message, an appointment, a proximity notification, etc.) in such a manner as not to disturb a user. The location manager 350 may manage location information of the electronic device. The graphic manager 351 may manage a graphic effect to be provided to a user and a user interface relating to the graphic effect. The security manager 352 may provide various security functions required for system security or user authentication. According to an example embodiment, in a case where the electronic device (for example, the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some of the existing elements, or may add new elements.

The API 360 (for example, the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 370 (for example, the application programs 147) may include, for example, one or more applications that can perform functions, such as home 371, dialer 372, SMS/MMS 373, Instant Message (IM) 374, browser 375, camera 376, alarm 377, contacts 378, voice dialer 379, e-mail 380, calendar 381, media player 382, album 383, clock 384. Additionally, although not shown, the applications may include other applications, such as, for example, and without limitation, health care (for example, measuring exercise quantity or blood sugar), or environment information (for example, atmospheric pressure, humidity, or temperature information).

According to an example embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to an external electronic device (for example, the electronic device 102 or 104), notification information generated by the other applications (for example, the SMS/MMS application, the e-mail application, the health care application, or the environmental information application) of the electronic device 101. Furthermore, the notification relay application may, for example, receive notification information from an external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a telephone call service or a message service) that are provided by the external electronic device.

According to an example embodiment, the applications 370 may include an application (for example, a health care application of a mobile medical appliance, etc.) that is designated according to the attribute of an external electronic device (for example, the electronic device 102 or 104). According to an example embodiment, the applications 370 may include an application received from an external electronic device (for example, the server 106, or the electronic device 102 or 104). According to an example embodiment, the applications 370 may include a preloaded application or a third-party application that can be downloaded from a server. The names of the elements of the program module 310, according to the embodiment illustrated in the drawing, may change depending on the types of operating systems.

According to various embodiments, at least a part of the program module 310 may be implemented in software, firmware, hardware, or a combination of two or more thereof. At least a part of the program module 310 may be implemented (executed) by the processor (the processor 210), for example. At least a part of the program module 310 may include, for example, a module, a program, a routine, a set of instructions, or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include, for example, and without limitation at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4A:
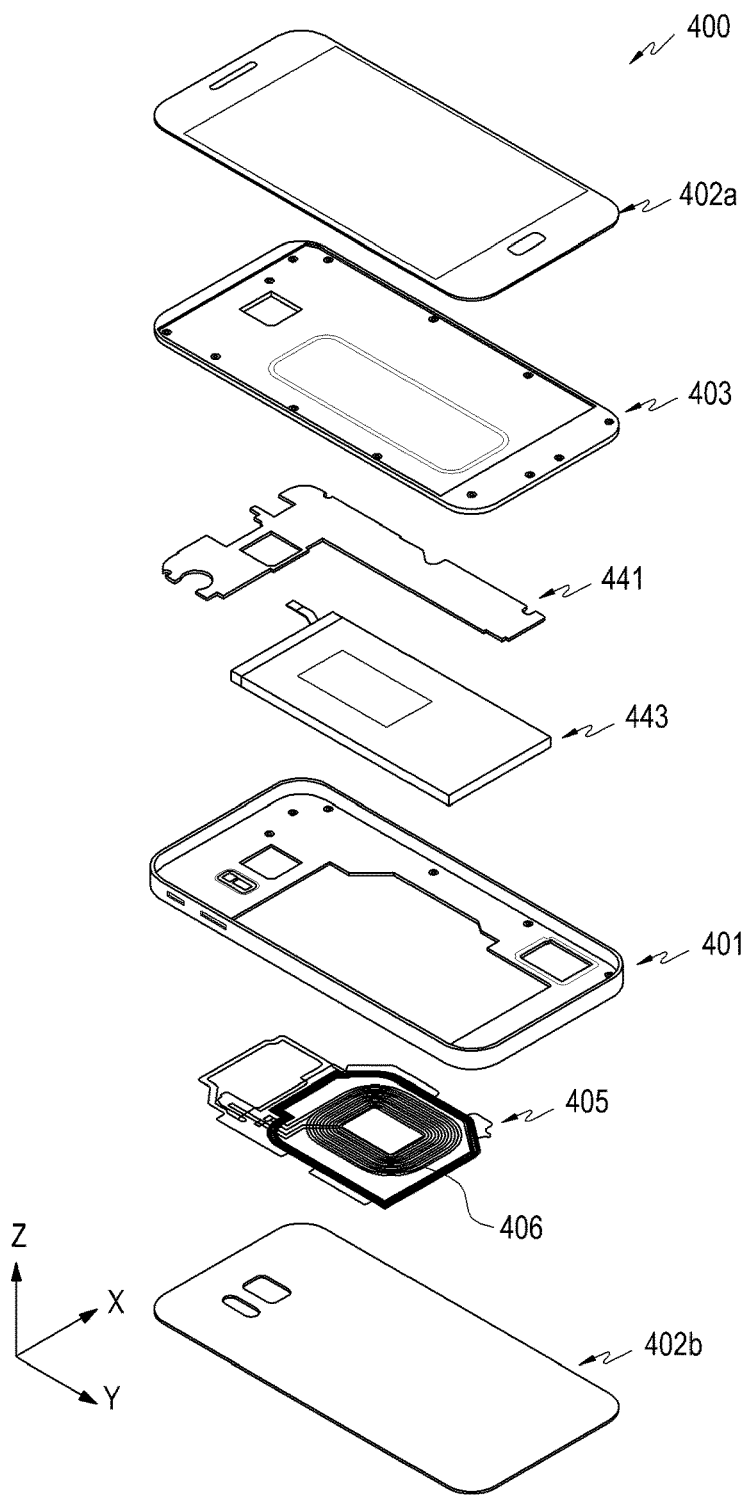
FIG. 4A is an exploded perspective view of an example electronic device according to various example embodiments of the present disclosure.
Figure 4B:
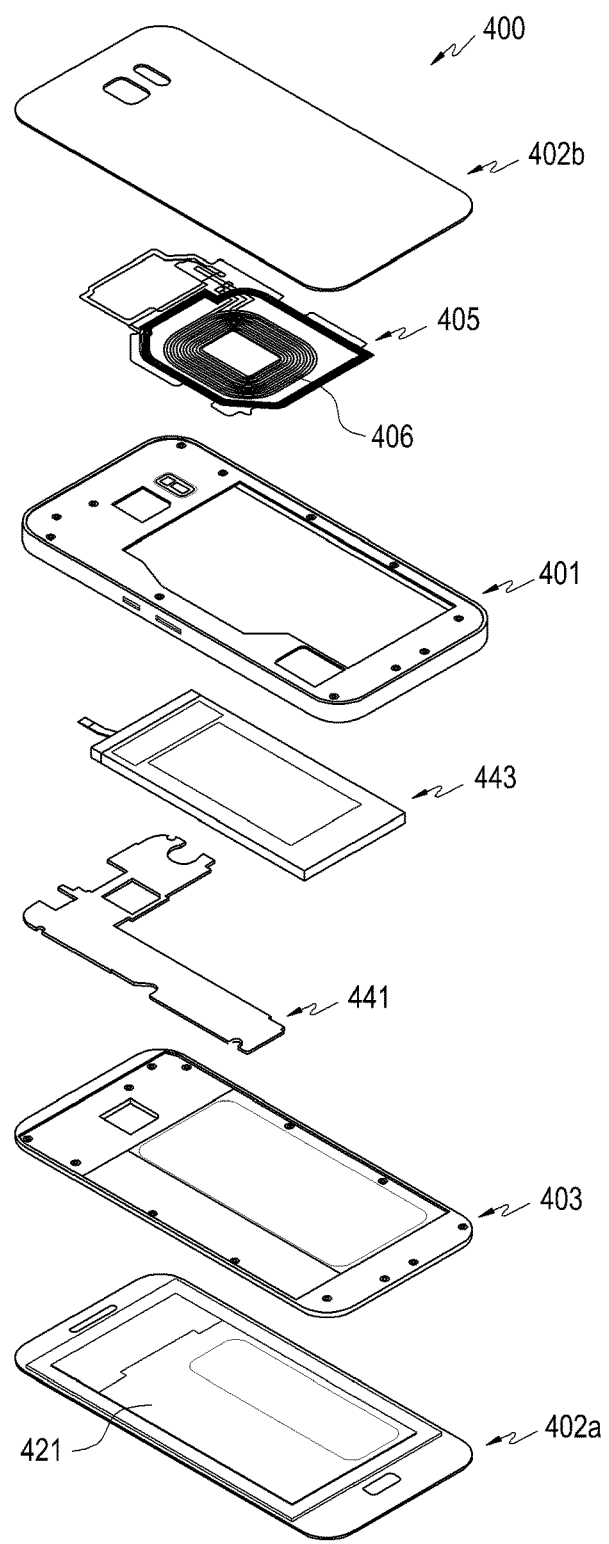
FIG. 4B is an exploded perspective view of an example electronic device, according to an example embodiment of the present disclosure, when viewed from another direction.
Figure 4C:
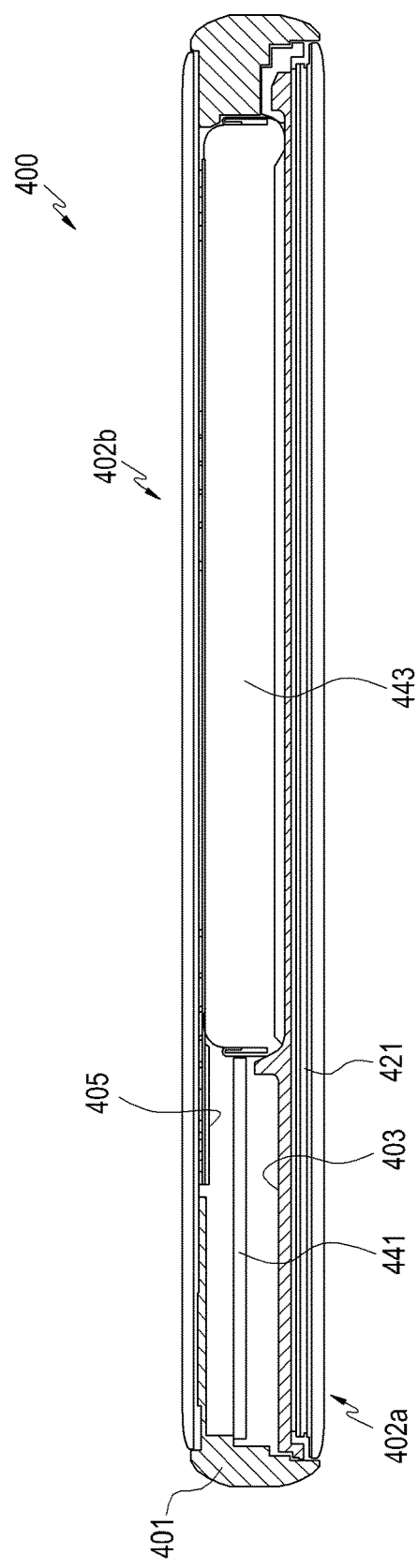
FIG. 4C is a cross-sectional view of the example electronic device according to an example embodiment of the present disclosure.

FIG. 4A is an exploded perspective view of an example electronic device 400 according to various example embodiments of the present disclosure. FIG. 4B is an exploded perspective view of the electronic device 400, according to an example embodiment of the present disclosure, when viewed from another direction. FIG. 4C is a cross-sectional view of the electronic device 400 according to an example embodiment of the present disclosure. The electronic device 400 of FIGS. 4A to 4C may, for example, be the electronic device 101 of FIG. 1.

In the three-dimensional Cartesian coordinate system of FIG. 4A, the X, Y, and Z axes may refer to the lateral, longitudinal, and thickness directions of the electronic device 400, respectively.

Referring to FIGS. 4A to 4C, the electronic device 400 may include: a housing 401; one or more plates 402a and 402b; an antenna unit 405 including a conductive pattern 406; and a control circuit (for example, the control circuit 1257 of FIG. 12) that is connected to the conductive pattern 406.

According to various embodiments, the housing 401 receives various types of electronic components therein, and at least a part of the housing 401 may be formed of a conductive material. For example, the housing 401 may include sidewalls constituting the outer side of the electronic device 400, and the part of the housing 401 that forms the external appearance of the electronic device 400 may be made of a metal material with conductivity. A circuit board 441 and/or a battery 443 may be received in the housing 401. For example, the circuit board 441 may have a processor (for example, the processor 201 of FIG. 2), a communication module (for example, the communication module 220 of FIG. 2), various types of interfaces (for example, the interface 270 of FIG. 2), and a power management module (for example, the power management module 295 of FIG. 2) that are mounted thereon in the form of an integrated circuit chip, and the control circuit (for example, the control circuit 1257 of FIG. 12) may also be mounted on the circuit board 441 in the form of an integrated circuit chip. For example, the control circuit may be a part of the aforementioned processor or communication module.

According to various embodiments, the plates 402a and 402b may be made of a material at least partially transmitting radio waves or a magnetic field therethrough, and may include the front cover 402a mounted on the front of the housing 401 and the back cover 402b mounted on the back of the housing 401. The front cover 402a may include a display device 421, for example. For example, the front cover 402a may include a window member made of reinforced glass and the display device 421 mounted on the inside of the window member. A touch panel may be provided between the window member and the display device 421. For example, the front cover 402a may be utilized as an input device having a touch screen function, while serving as an output device that outputs an image on a screen. The back cover 402b may be mounted in opposing relation to the front cover 402a and may be made of a material (for example, reinforced glass or a synthetic resin) capable of transmitting radio waves or a magnetic field therethrough. The plates, for example, the front cover 402a and the back cover 402b may be mounted on the housing 401 to form the external appearance of the electronic device 400 together with the housing 401.

According to various embodiments, a support member 403 may be mounted in the housing 401. The support member 403 may be made of a metal material and may be disposed within the space formed by the housing 401 and the front cover 402a. For example, the support member 403 may be interposed between the display device 421 and the circuit board 441. The support member 403 may prevent the integrated circuit chips mounted on the circuit board 441 from making contact with the display device 421 and may provide an electromagnetic shielding function to prevent electromagnetic interference between the integrated circuit chips. The support member 403 may make up for the rigidity of the electronic device 400. For example, the housing 401 may have a plurality of openings or recesses according to the arrangement of electronic components inside the electronic device 400, where the openings or recesses may cause a decrease in the rigidity of the housing 401 or the electronic device 400. The support member 403 may be mounted in, and fastened to, the housing 401 to enhance the rigidity of the housing 401 or the electronic device 400.

Although not specifically illustrated in the drawings, according to various embodiments, various structures may be formed on the surface of the housing 401 and the support member 403 according to the arrangement of electronic components disposed inside the electronic device 400, or according to the fastening structure between the housing 401 and the support member 403. For example, a space for receiving the integrated circuit chips mounted on the circuit board 441 may be formed in the housing 401 and/or the support member 403. The space for receiving the integrated circuit chips may be formed in a recess shape, or may be formed by ribs surrounding the integrated circuit chips. According to various embodiments, the housing 401 and the support member 403 may have fastening bosses and fastening holes that correspond to each other. For example, the support member 403 may be fastened to the housing 401 to face the housing 401, or to be accommodated in the housing 401, by fastening a fastening member (such as a screw, etc.) to a fastening member or a fastening hole.

According to various embodiments, the antenna unit 405 including the conductive pattern 406 may be mounted on the housing 401 such that the side of the antenna unit 405 opposite to the circuit board 441 faces the housing 401. For example, the antenna unit 405 may be located within the space formed by the back cover 402*b* and the housing 401. The antenna unit 405 may include at least one conductive pattern 406, which may be, for example, a planar coil, and may transmit and receive radio waves or may generate a magnetic field through the conductive pattern 406. The antenna unit 405 will be described below in more detail with reference to FIGS. 5 to 11 according to an example embodiment of the present disclosure.

According to various embodiments, radio waves transmitted and received through the conductive pattern 406 of the antenna unit 405, or a magnetic field generated by the conductive pattern 406 of the antenna unit 405, may pass through the plate, for example, the back cover 402*b*. For example, the back cover 402*b* may be made of a reinforced glass material or a synthetic resin material. In a case where the back cover 402*b* is made of a transparent material (such as reinforced glass), the structure inside the back cover 402*b*, or an electronic component (for example, the antenna unit 405) inside the back cover 402*b*, may be concealed by forming a painting layer on the inside or outside of the back cover 402*b*.

Figure 5A:
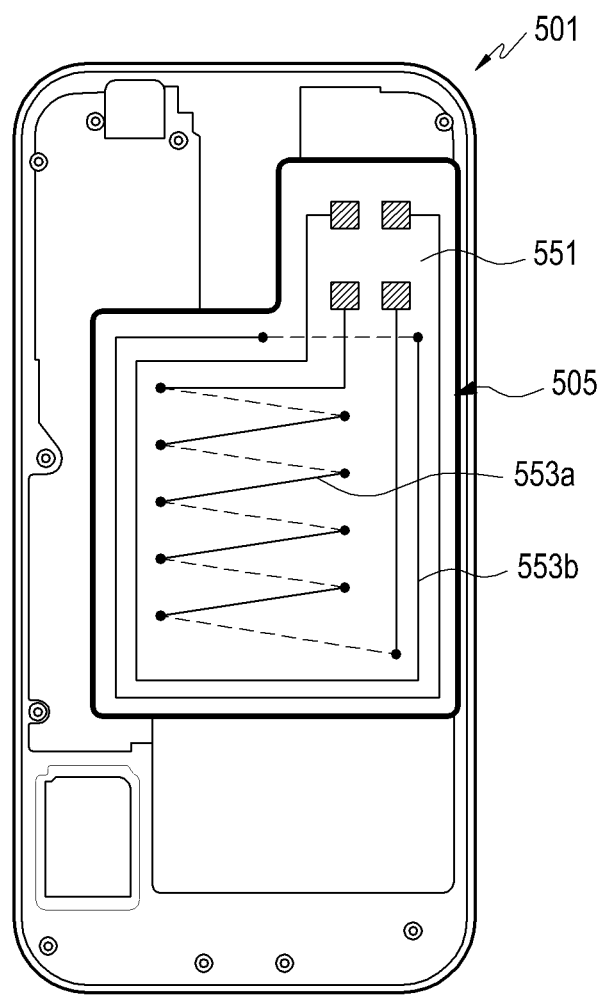
FIG. 5A is a plan view of an example electronic device, according to various example embodiments of the present disclosure, in which an antenna unit including a conductive pattern is installed in a housing.
Figure 5B:
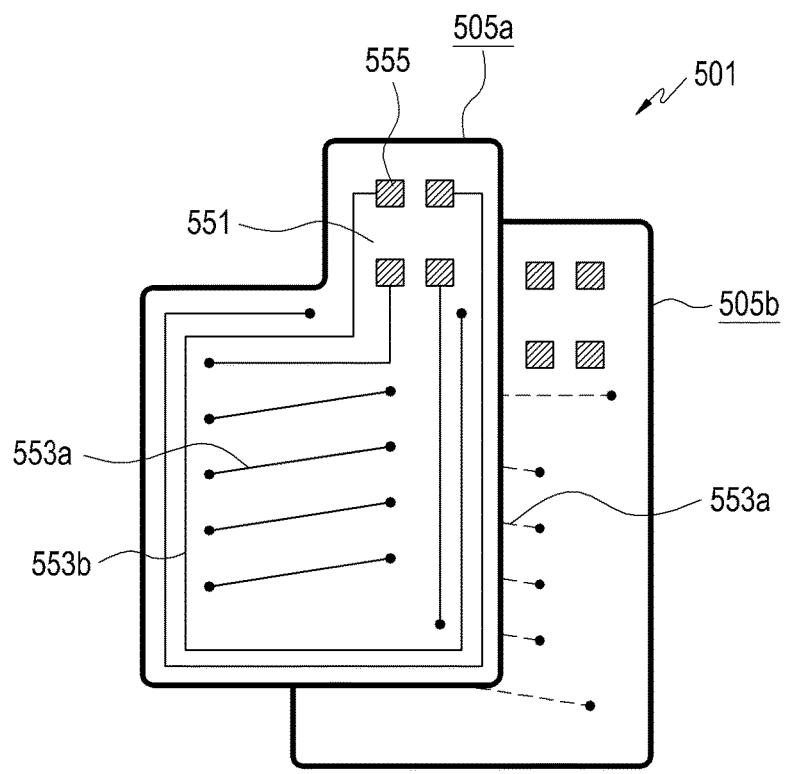
FIG. 5B is a plan view of a plurality of antenna units of the electronic device according to an example embodiment of the present disclosure, where the antenna units overlap each other.

FIG. 5A is a plan view illustrating an example electronic device, according to various example embodiments of the present disclosure, in which an antenna unit 505 including a conductive pattern 553*a*, 553*b* is installed in a housing 501. FIG. 5B is a plan view of a plurality of stacked antenna units 505 of the electronic device according an example embodiment of the present disclosure, where the stacked antenna units overlap each other. The antenna unit 505 of FIGS. 5A and 5B may be the antenna unit 405 of FIGS. 4A and 4B. According to an example embodiment, the housing 501 of FIGS. 5A and 5B may be the housing 401 of FIGS. 4A and 4B.

Referring to FIGS. 5A and 5B, the antenna unit 505 may include a base member 551 and at least one conductive pattern(s) 553*a*, 553*b*.

According to various embodiments, the base member 551 may include a film made of an insulating or dielectric material and may provide a region for forming the conductive pattern(s) 553*a*, 553*b*. For example, the antenna unit 505 including the conductive pattern 553 may have the external appearance of a flexible printed circuit board. Alternatively, the antenna unit 505 may have the structure of a multi-layer circuit board that has the external appearance of a flexible printed circuit board. For example, the conductive pattern(s) 553*a*, 553*b* may be disposed on one surface or the opposite surface of the base member 551. If the base member 551 has the structure of a multi-layer circuit board, the plurality of conductive patterns 553*a*, 553*b* may be formed on appropriate layers constituting the base member 551, respectively. For example, the conductive patterns 553*a*, 553*b* may be formed by etching (for example, wet etching or dry etching) a part of a conductive layer formed on the base member 551 through a printing method using a conductive ink, a deposition method, a painting method, and/or a plating method.

According to an example embodiment, the conductive pattern(s) 553*a*, 553*b* may form a loop antenna. In a case where the loop antenna is a part of a flexible printed circuit board shape, a plurality of loop antennas for communication may be included in one flexible printed circuit board.

According to an example embodiment, an antenna formed of at least one flexible printed circuit board may include loop antennas for NFC, MST, and wireless communication. For example, if the electronic device has front and back sides made of glass, a flexible printed circuit board antenna may be located between the backside glass and an internal housing (for example, the aforementioned housing 501) of the terminal. For example, at least a part of the internal housing may include a non-conductive material (for example, molded plastic). For example, at least a part of the internal housing may include an opening. At least a part of the flexible printed circuit board antenna may overlap a battery inside the terminal.

According to an example embodiment, a loop antenna for MST that is disposed to vertically pass through the upper surface of the planar antenna unit 505 may include conductive line(s) wound 5 to 100 times. According to an example embodiment, a loop antenna for NFC that is disposed on a horizontal surface of the antenna unit 505 may include conductive line(s) wound 1 to 10 times.

According to an example embodiment, the flexible printed circuit board antenna may further include a heat dissipation sheet (for example, a graphite sheet) and a shielding material (for example, ferrite).

According to an example embodiment, a card for payment or a fingerprint sensor for performing user authentication may be included in the home key on the front, in a key on the side, or in a separate key on the back of the terminal. Furthermore, a fingerprint sensor may be included in at least a part of the display panel.

The base member 551 according to various embodiments may include connecting pieces 555. The connecting pieces 555 may provide a means for connecting the conductive pattern(s) 553*a*, 553*b* to the control circuit or the communication module of the electronic device (for example, the electronic devices 101, 201, and 400 illustrated in FIGS. 1, 2, and 4A). For example, end portion(s) of the conductive pattern(s) 553*a*, 553*b* may be located on the connecting pieces 555 and may be connected to the control circuit or the communication module through a connection member, such as a connector, a pogo pin, or a C-clip.

The conductive patterns 553a, 553b may be arranged to be adjacent to each other or to overlap each other, or may be arranged such that one conductive pattern surrounds the other, when the antenna unit 505 is viewed from above, for example, when the antenna unit 505 disposed on the housing 501 is viewed from behind the electronic device (for example, the electronic device 400 of FIG. 4A). In a specific embodiment of the present disclosure, the first and second conductive patterns 553a, 553b are formed on the base member 551, and the first conductive pattern 553a is disposed to be surrounded by the second conductive pattern 553b.

According to various embodiments, the first conductive pattern 553a may include a plurality of turns of a conductive line wound in a helical or polygonal shape, and may be disposed to be substantially perpendicular to the housing 501 or the plate (for example, the back cover 402b) when the antenna member 505 is mounted in the housing 501. The first conductive pattern 553a may be connected to the control circuit (for example, the control circuit 1357 of FIG. 13) to transmit and receive radio waves or power and to generate a magnetic field.

According to various embodiments, the second conductive pattern 533b may include a plurality of turns of a conductive line wound in a circular shape, a polygonal shape, or a closed loop shape made up of a curved line and a straight line. The second conductive pattern 553b may be disposed to be substantially parallel to the housing 501 or the back cover 502b. The second conductive pattern 553b may be connected to the control circuit to transmit and receive radio waves or power and to generate a magnetic field.

According to various embodiments, the second conductive pattern 553b may be substantially coplanar with the first conductive pattern 553a. In an example embodiment, if the base member 551 has a multi-layer circuit board shape (a first antenna unit 505a and a second antenna unit 505b), a third conductive pattern (not illustrated) having a shape similar to that of the second conductive pattern 553b may be formed on a different layer from the second conductive pattern 553b. Even though the first to third conductive patterns are formed on different layers, respectively, the first to third conductive patterns may be disposed in almost the same plane if the base member 551 has a film shape. In the arrangement of the first to third conductive patterns, the first to third conductive patterns may have a closed loop shape and may be arranged to be adjacent to each other or to overlap each other, or may be arranged such that one conductive pattern surrounds another one or the others.

According to various embodiments, the first and/or second conductive pattern 553a, 553b may transmit and receive radio waves or wireless power, or may generate a magnetic field. According to various embodiments, radio waves or wireless power may be transmitted and received, or a magnetic field may be generated, through one conductive pattern or a combination of two or more conductive patterns under the control of the control circuit.

According to various embodiments, a matching circuit, an integrated circuit, and/or a switching element may be disposed on a line connecting the control circuit and the first and/or second conductive pattern 553a, 553b to adjust the resonant frequencies or magnetic flux distributions of the respective conductive patterns. For example, if the control circuit includes an NFC module, the first conductive pattern 553a may be connected to the NFC module to perform a near field communication function.

According to various embodiments, the control circuit (for example, the control circuit 1357 of FIG. 13) may further include a Magnetic Secure Transfer (MST) module. The first and/or second conductive pattern may be connected to at least one of the NFC module and the MST module of the control circuit to perform at least one of an NFC function and an MST function under the control of the control circuit. The conductive pattern connected to the MST module may generate a magnetic field under the control of the control circuit.

According to an example embodiment, among the plurality of coils, the coil for NFC payment may be mounted in the outermost position since the coil for NFC payment is modulated in a higher frequency (for example, 15 MHz) band than the two remaining coils (for example, induction coils for wireless charging that utilize a frequency band of 100 to 205 KHz) and thus is most greatly affected by the surrounding coil antennas. According to an example embodiment, the size of the coil for MST payment may agree with the operating range of the corresponding coil, and thus the coil for MST payment may be mounted in the middle area of the plurality of coils.

FIGS. 6A, 6B, 6C and 6D are diagrams illustrating an exploded perspective view and a stack structure of an antenna unit 605 including conductive patterns and a shielding structure 604, according to various embodiments of the present disclosure. According to an example embodiment, the antenna unit 605 of FIGS. 6A to 6C may be the antenna unit 505 of FIGS. 5A and 5B or the antenna unit 405 of FIGS. 4A and 4B. According to an example embodiment, a first coil 653a and/or a second coil 653b of FIGS. 6A to 6C may be the first conductive pattern 553a and/or the second conductive pattern 553b.

Figure 6A:
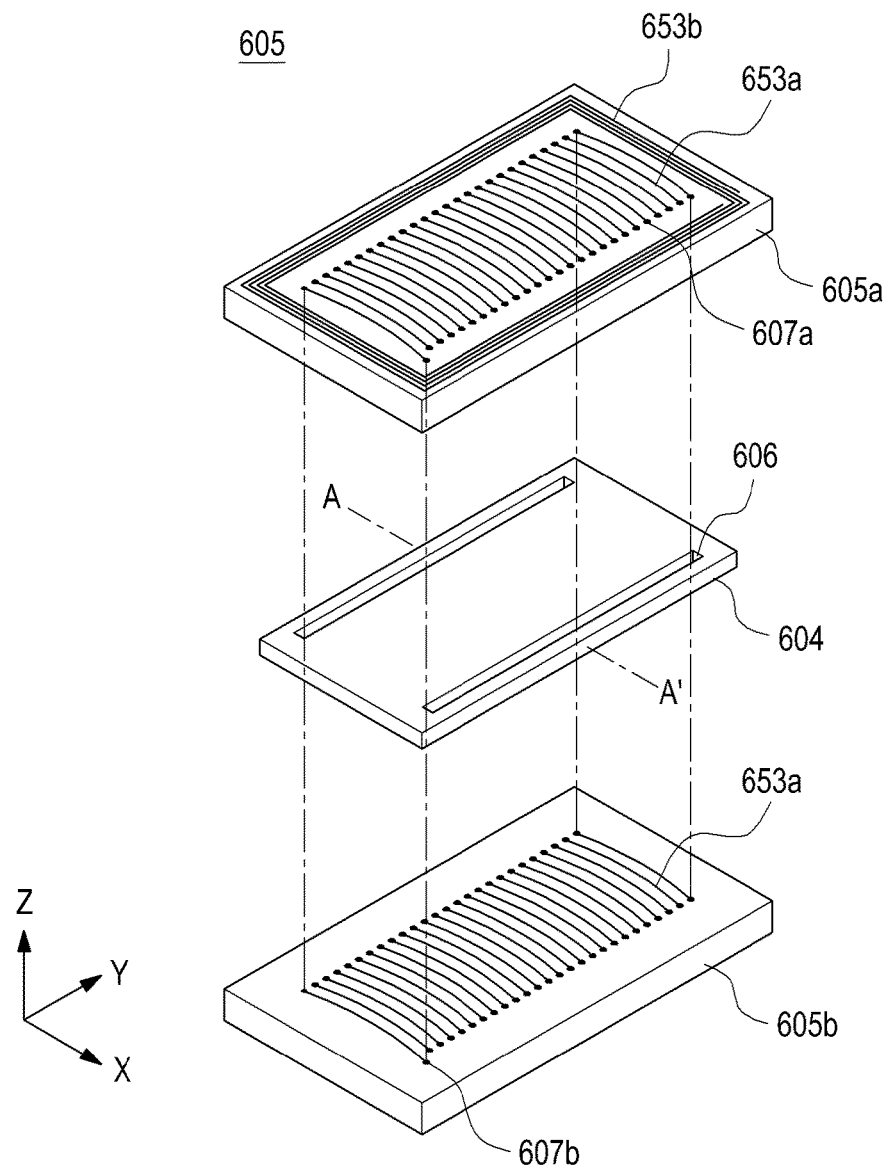
FIGS. 6A, 6B, 6C and 6D are diagrams illustrating an exploded perspective view and a stack structure of an antenna unit including conductive patterns and a shielding structure, according to various example embodiments of the present disclosure.

Referring to FIG. 6A, the antenna unit 605 including the conductive patterns may be two or more printed circuit boards stacked one above another, and may include the shielding structure 604 between the plurality of printed circuit boards to prevent magnetic coupling between the conductive patterns or to prevent a magnetic field from being offset by metal, etc.

As illustrated in FIG. 6A, the antenna unit 605 of the present disclosure may include a first antenna unit 605a and a second antenna unit 605b. The first antenna unit 605a may be disposed above the second antenna unit 605b and may include at least one of the first and second coils 653a and 653b. The second antenna unit 605b may be disposed below the first antenna unit 605a and may include at least one of the first and second coils 653a and 653b. The first antenna unit 605a and the second antenna unit 605b may include a flexible printed circuit board.

According to various embodiments, the first and/or second coil 653a, 653b that transmits and receives radio waves or generates a magnetic field may have various shapes according to a mounting space, but may have a circular or polygonal shape having vertical and horizontal symmetry. For example, the first and/or second coil 653a, 653b may include a plurality of turns of a conductive line wound in a circular or polygonal shape on a base member.

According to various embodiments, the first antenna unit 605a may include a first region in which the first coil 653a is disposed and a second region in which the second coil 653b is disposed. For example, at least a part of the first coil 653a having a first plurality of turns that passes through the first antenna unit 605a in the directions substantially perpendicular to one surface of the plate (for example, the back cover 402b of FIGS. 4A to 4C) may be disposed on the first antenna unit 605a. In another example, the second coil 653b having a second plurality of turns that is substantially parallel to the surface of the plate may be disposed on the first antenna unit 605a. In another example, the second coil 653b may have a planar coil shape on the first antenna unit 605a to surround the first coil 653a.

According to various embodiments, the first coil 653a may have a helical coil shape to which the first and second antenna units 605a and 605b are connected.

According to various embodiments, at least a part of the first antenna unit 605a may be spaced apart from the second antenna unit 605b with the shielding structure 604 therebetween. The first antenna unit 605a and the second antenna unit 605b may be a flexible printed circuit board.

The electronic device, according to various embodiments of the present disclosure, may include the shielding structure 604 disposed between the first and second antenna units 605a and 605b to restrict interference caused by a magnetic field generated in the first and second antenna units 605a and 605b or to prevent the magnetic field from being offset by a metal material of the electronic device.

According to various embodiments, the shielding structure 604 may have a plurality of openings 606 formed through opposite lateral edge portions thereof, and the first coil 653a may be connected with the first and second antenna units 605a and 605b through the plurality of openings 606. For example, the first coil 653a may be connected to via holes 607b, which are formed through the second antenna unit 605b, via the openings 606 through via holes 607a, which are formed through the first antenna unit 605a, to form a helical antenna.

Figure 6B:
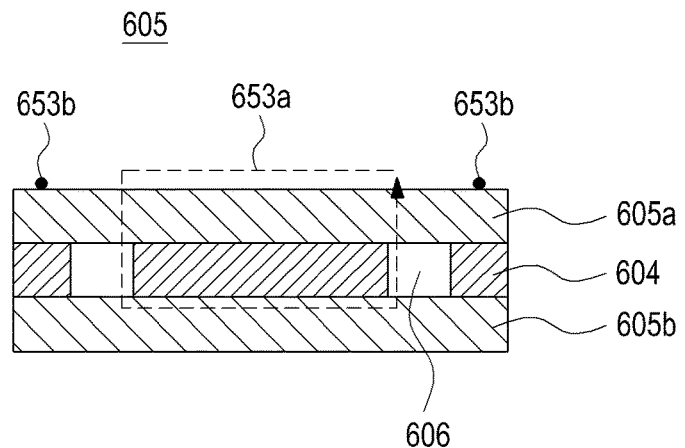
Figure 6C:
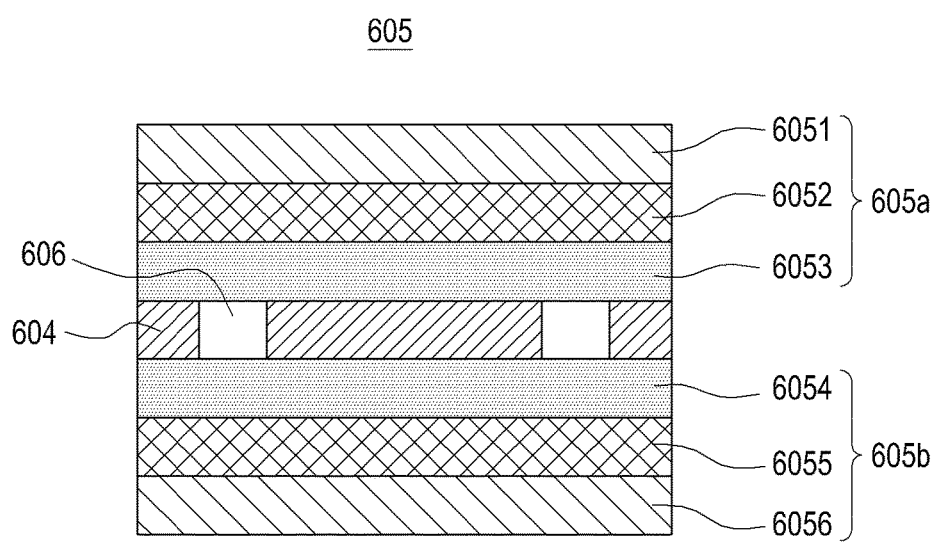

FIG. 6B is a side view of FIG. 6A, and FIG. 6C is a sectional view taken along line A-A' of FIG. 6A. FIGS. 6B and 6C illustrate a stack structure of the antenna unit 605, which includes the conductive patterns, and the shielding structure 604, according to various embodiments. Referring to FIGS. 6B and 6C, the first antenna unit 605a, the shielding structure 604, and the second antenna unit 605b may be arranged in sequence from top to bottom.

The first antenna unit 605a, according to various embodiments of the present disclosure, may include a base layer 6053 disposed to make contact with the shielding structure 604 and a pattern layer 6052 disposed above the base layer 6053 and including the first and/or second coil 653a, 653b that is a conductive pattern. The pattern layer 6052 may be produced to contain copper (Cu). A film layer 6051 may be provided above the pattern layer 6052 to protect the pattern layer 6052 from the outside. According to an example embodiment, the first antenna unit 605a may include a flexible printed circuit board.

According to various embodiments of the present disclosure, the second antenna unit 605b may be configured in multiple layers to correspond to the first antenna unit 605a with the shielding structure 604 therebetween. For example, the second antenna unit 605b may include a base layer 6054 disposed to make contact with the shielding structure 604 and a pattern layer 6055 disposed below the base layer 6054 and including the first and/or second coil 653a, 653b that is a conductive pattern. The pattern layer 6055 may be produced to contain copper (Cu). A film layer 6056 may be provided below the pattern layer 6055 to protect the pattern layer 6055 from the outside. According to an example embodiment, the second antenna unit 605b may include a flexible printed circuit board.

The shielding structure 604, according to various embodiments, may be configured in a combination of shielding members with different magnetic permeability. For example, in a case where the shielding structure 604 is configured with different shielding members, one of the shielding members may use a material of a solenoid type that has magnetic permeability (for example, about 750 or more) advantageous for MST. In another example, another shielding member may be implemented using a material of a spiral type that has magnetic permeability (for example, about 250) advantageous for NFC.

According to various embodiments, one first coil 553a may be arranged in an X-type (for example, in a solenoid form) on the first antenna unit 605a and the second antenna unit 605b and may be connected with a control circuit (for example, the control circuit 1357 of FIG. 13) to transmit and receive radio waves or power and to generate a magnetic field. In another example, the first coil 653a may be designed such that the intensity of a magnetic field varies depending on regions.

According to various embodiments, the first coil 653a arranged in the X-type may be formed in a helical shape that passes through the first antenna unit 605a, turns about the second antenna unit 605b, and returns to the first antenna unit 605a. For example, the first coil 653a having the first plurality of turns may be arranged to be wound around a first axis (the Y-axis) in a first direction.

According to various embodiments, the first and second antenna units 605a and 605b may have a plurality of via holes 607a on one side thereof to guide the direction of the first coil 653a and to provide passages thereof. For example, the first coil 653a having passed through the first antenna unit 605a may pass through the second antenna unit 605b via the plurality of via holes 607a arranged on one side thereof, and the flow may be repeated as mentioned above.

According to various embodiments, the plurality of via holes 607a may help to generate a magnetic field around the first coil 653a by connecting different flexible printed circuit boards. In one example, the intensity of the magnetic field may be controlled according to the thickness of the shielding structure 604 or the pattern layers 6052 and 6055. For example, the intensity of the magnetic field may increase with an increase in the thickness of the shielding structure 604 or the pattern layers 6052 and 6055. According to various embodiments, the X-type magnetic field generating module may be suitable for an MST method. The first coil 653a arranged in the X-type by means of the shielding structure 604 disposed between the first and second antenna units 605a and 605b has no null point or region, and even though the first coil 653a is covered with a plate including metal (for example, the back cover 402b of FIGS. 4A to 4C) or a display, it is possible to ensure the performance of the magnetic field, avoiding the plate or display. For example, the term "null region" may refer to a point, area, and/or region that has a lower intensity of magnetic flux than other areas since magnetic fluxes generated by a current flowing through a coil are offset each other. Considering power consumption and interference with another transmission/reception device (for example, antenna), the magnitude of the magnetic flux may be restricted, and if the null point or region is formed, payment information may not be effectively transmitted.

According to various embodiments, the electronic device may include an MST module that stores data recorded in tracks of a magnetic card and uses a module for magnetic field communication, for example, the X-type magnetic field generating module. The MST module may transmit a magnetic field signal loaded with the data, which is recorded in the tracks, to a card reader through an antenna (for example, the first coil 653a). Then, the same current as that when the magnetic card is swiped through the header of the card reader may be generated in the card reader. Namely, a user may make a payment by bringing the electronic device to a close location to the card reader, or by bringing the electronic device into contact with the card reader. For example, the user may make a payment without using a separate magnetic card, by bringing the portable electronic device generating a magnetic field signal to a close location to the card reader, or by bringing the same into contact with the card reader.

According to an example embodiment, the MST module may include a coil antenna. For example, an MST control module may supply a voltage to opposite ends of a coil antenna in different directions according to data (for example, 0 or 1 bit) and may control the direction of the current flowing through the coil antenna. A signal transmitted through the coil antenna (a magnetic field signal generated by a coil through which a current flows) may generate an induced electromotive force in a POS reader in a similar form to an operation of making a magnetic card actually read by the POS reader.

According to various embodiments, one second coil 653b may be arranged in a Y-type (for example, in a spiral form) on the first antenna unit 605a and may be connected with the control circuit (for example, the control circuit 1357 of FIG. 13) to transmit and receive radio waves or power and to generate a magnetic field. In another example, the second coil 653b may be designed such that the intensity of a magnetic field varies depending on regions.

According to various embodiments, the second coil 653b arranged in the Y-type may be formed in a rotary loop shape on the horizontal surface of the first antenna unit 605a. For example, the second coil 653b having the second plurality of turns may be arranged to be wound around a second axis (the Z-axis) in a second direction.

According to various embodiments, the intensity of a magnetic field may be amplified or decreased by disposing a plurality of second coils 653b separated from each other on the first and second antenna units 605a and 605b and making currents flow in the same direction or in opposite directions.

According to various embodiments, the Y-type magnetic field generating module may be suitable for an NFC method. Thanks to the shielding structure 604 disposed between the first or second antenna unit 605a or 605b and a metal member, a magnetic field generated according to the flow of a current through the second coil 653b arranged in the Y-type may prevent offsetting caused by surrounding metal.

According to various embodiments, the Y-type magnetic field generating module may perform near field communication through the conductive pattern (for example, the second coil 653b). For example, the Y-type magnetic field generating module may be connected to the second coil 653b through a non-illustrated switch member. For example, a matching circuit making the second coil 653b suitable for near field communication may be disposed on a line connecting the switch member and the second coil 653b.

Referring again to FIGS. 6A to 6C, the electronic device according to the present disclosure may include both the X-type magnetic field generating module and the Y-type magnetic field generating module. According to an example embodiment, the X-type magnetic field generating module may be implemented in the middle of the antenna unit 605, and the first coil 653a may be electrically connected with an MST module (for example, the MST module 1357b of FIG. 13) or a wireless charging module (for example, the wireless charging module 1357c of FIG. 13). According to another embodiment, the Y-type magnetic field generating module may be implemented on the periphery of the antenna unit 605, and the second or third coil 653b or 653c may be electrically connected with an NFC module (for example, the NFC module 1357a of FIG. 13) or a wireless charging module (for example, the wireless charging module 1357c of FIG. 13). The control circuit (for example, the control circuit 1357 of FIG. 13) may include at least one of a wireless charging module, an NFC module, and an MST module.

Figure 6D:
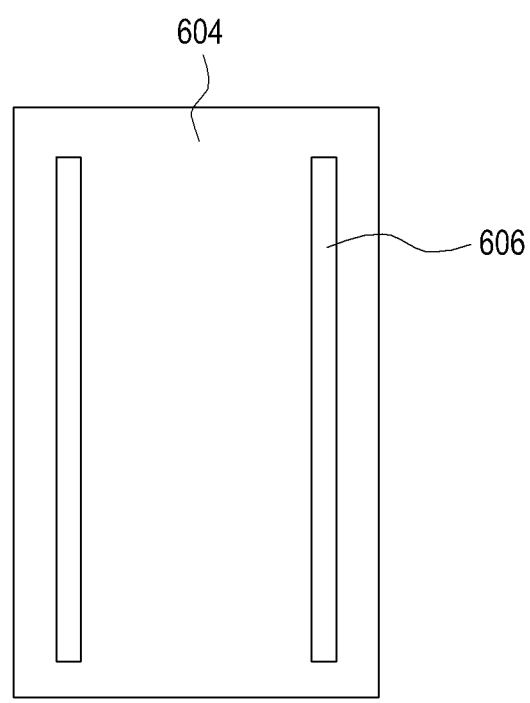

FIG. 6D illustrates the shielding structure 604 viewed from above, according to various embodiments. The shielding structure 604 may include the openings 606 such that the first and/or second coil 653a, 653b arranged on the first and second antenna units 605a and 605b may be connected with each other. The openings 606 may be arranged parallel to the via holes 607a of the first antenna unit 605a and the via holes 607b of the second antenna unit 605b.

For example, the openings 606 may have an elongated slot shape arranged along the longitudinal direction of the shielding structure 604 and may be arranged on opposite sides of the shielding structure 604 with respect to the center thereof. The first coil 653a may extend from the first antenna unit 605a to the second antenna unit 605b, or from the second antenna unit 605b to the first antenna unit 605a, through the openings 606 having an elongated slot shape.

According to various embodiments, the shielding structure 604 disposed between the first and second antenna units 605a and 605b may prevent a magnetic field from being offset by a metal material. However, the shape of the shielding structure 604 is not limited thereto, and the shielding structure 604 may be designed in various shapes to correspond to various shapes (such as a circular shape, a polygonal shape, etc.) of the antenna unit 605.

FIGS. 7A, 7B, 7C and 7D illustrate various example shapes of an example antenna unit disposed in an electronic device according to various example embodiments. The antenna unit 705 of FIGS. 7A to 7D may be the antenna unit 405 of FIGS. 4A and 4B. The first and/or second coil 753a, 753b of FIGS. 7A to 7D may be the conductive pattern 406 of FIGS. 4A to 4C.

Figure 7A:
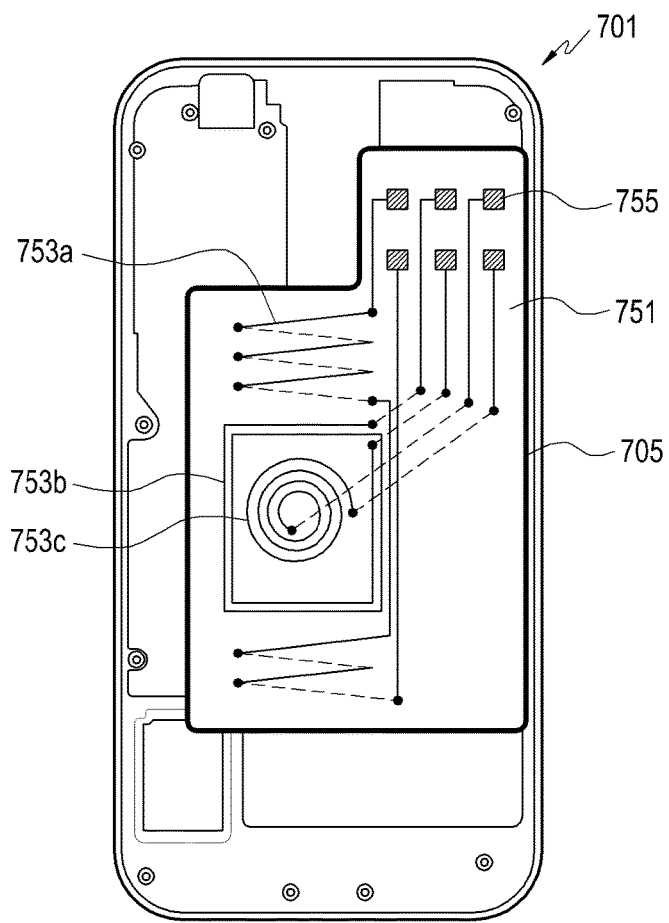
FIGS. 7A, 7B, 7C and 7D are diagrams illustrating various shapes of an antenna unit disposed in an electronic device according to various example embodiments of the present disclosure.

FIG. 7A is a plan view of the electronic device, according to the embodiment of the present disclosure, in which the antenna unit 705 including a conductive pattern is installed in a housing 701.

Referring to FIG. 7A, the antenna unit 705 may include a base member 751 and one or more conductive pattern(s) 753a, 753b, 753c. According to various embodiments, the base member 751 may include a film made of an insulating or dielectric material and may provide a region for forming the conductive pattern(s) 753a, 753b, 753c. For example, the antenna unit 705 including the conductive pattern 753a, 753b, 753c may have the external appearance of a flexible printed circuit board. Alternatively, the antenna unit 705 may have the structure of a multi-layer circuit board that has the external appearance of a flexible printed circuit board. Hereinafter, specific contents will be omitted since the contents are the same as those illustrated in FIGS. 5A and 5B and FIGS. 6A to 6D.

According to an example embodiment, some of the conductive pattern(s) 753a, 753b, 753c may form a loop antenna. In a case where the loop antenna is a part of a flexible printed circuit board shape, a plurality of loop antennas for communication may be included in one flexible printed circuit board.

According to an example embodiment, an antenna formed of at least one flexible printed circuit board may include loop antennas for NFC, MST, and wireless charging. For example, if the electronic device has front and back sides made of glass, a flexible printed circuit board antenna may be located between the backside glass and an internal housing (for example, the aforementioned housing 401) of the terminal. For example, at least a part of the internal housing may include a non-conductive material (for example, molded plastic). For example, at least a part of the internal housing may include an opening. At least a part of the flexible printed circuit board antenna may overlap a battery inside the terminal.

The base member 751 according to various embodiments may include connecting pieces 755. The connecting pieces 755 may provide a means for connecting the conductive pattern(s) 753a, 753b, 753c to a control circuit or a communication module of the electronic device (for example, the electronic devices 101, 201, and 400 illustrated in FIGS. 1, 2, and 4A). For example, end portion(s) of the conductive pattern(s) 753a, 753b, 753c may be located on the connecting pieces 755 and may be connected to the control circuit or the communication module through a connection member, such as a connector, a pogo pin, or a C-clip.

According to various embodiments, the first conductive pattern 753a may include a plurality of turns of a conductive line wound in a helical or polygonal shape, and may be disposed to be substantially perpendicular to the housing 701 or a plate (for example, the back cover 402b) when the base member 751 is mounted in the housing 701. The first conductive pattern 753a may be connected to the control circuit (for example, the control circuit 1357 of FIG. 13) to transmit and receive radio waves or power and to generate a magnetic field.

According to various embodiments, the second and/or third conductive pattern 753b, 753c may include a plurality of turns of a conductive line wound in a circular shape, a polygonal shape, or a closed loop shape made up of a curved line and a straight line. The second and/or third conductive pattern 753b, 753c may be disposed to be substantially parallel to the housing 701 or the back cover 502b. The second and/or third conductive pattern 753b, 753c may be connected to the control circuit to transmit and receive radio waves or power and to generate a magnetic field.

According to various embodiments, the second and/or third conductive pattern 753b, 753c may be substantially coplanar with the first conductive pattern 753a. In an example embodiment, if the base member 751 has a multi-layer circuit board shape (a first antenna unit 705a and a second antenna unit 705b), the first, second, and/or third conductive pattern may be disposed on almost the same plane. In the arrangement of the first, second, and/or third conductive pattern, the first to third conductive patterns may have a closed loop shape and may be arranged to be adjacent to each other or to overlap each other, or may be arranged such that one conductive pattern surrounds another one or the others.

According to various embodiments, the conductive pattern(s) 753a, 753b, 753c may transmit and receive radio waves or wireless power, or may generate a magnetic field. According to various embodiments, radio waves or wireless power may be transmitted and received, or a magnetic field may be generated, through one conductive pattern or a combination of two or more conductive patterns under the control of the control circuit.

According to various embodiments, a matching circuit, an integrated circuit, and/or a switching element may be disposed on a line connecting the control circuit and the first, second, and/or third conductive pattern 753a, 753b, 753c to adjust the resonant frequencies or magnetic flux distributions of the respective conductive patterns. For example, if the control circuit includes an NFC module, the first conductive pattern 753a may be connected to the NFC module to perform a near field communication function. In another example, if the control circuit includes an MST module, the second conductive pattern 753b may be connected to the MST module to perform a magnetic secure transmission function, and if the control circuit includes a WPC (magnetic induction type) module, the third conductive pattern 753c may be connected to the WPC module to perform a wireless charging function.

Figure 7B:
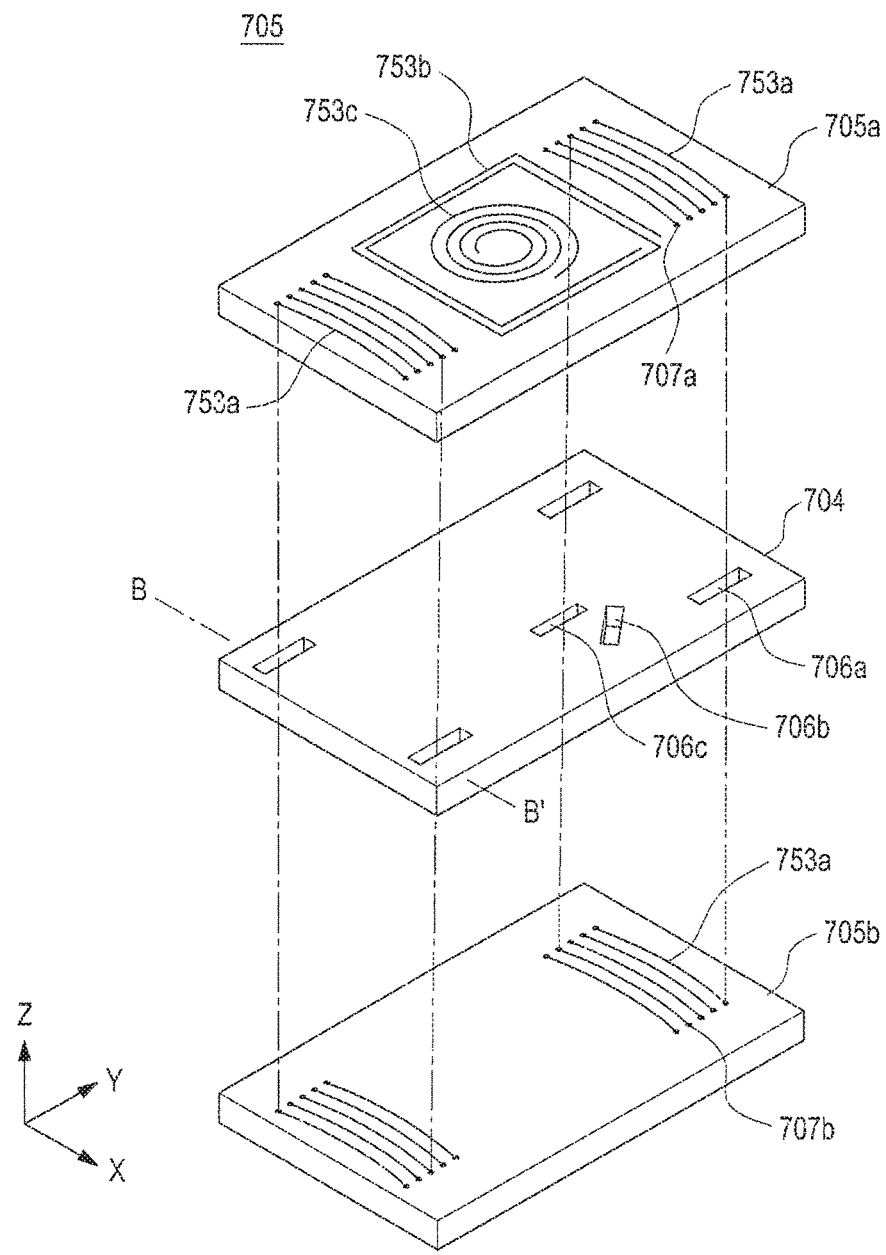
Figure 7C:
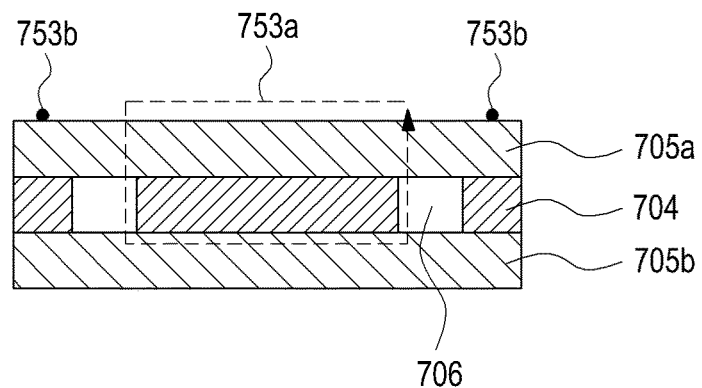

FIG. 7B is an exploded perspective view illustrating the antenna unit 705, which includes the conductive patterns, and a shielding structure 704 according to various embodiments of the present disclosure, and FIG. 7C illustrates a stack structure taken along line B-B' of FIG. 7B.

Referring to FIGS. 7B and 7C, the antenna unit 705 including the conductive patterns may be two or more printed circuit boards stacked one above another, and may include the shielding structure 704 between the plurality of printed circuit boards to prevent magnetic coupling between the conductive patterns or to prevent a magnetic field from being offset by metal, etc.

According to various embodiments, the antenna unit 705 may include: the first antenna unit 705a disposed on the upper side thereof and including at least one of the first, second, and third coils 753a, 753b, and 753c; and the second antenna unit 705b disposed below the first antenna unit 705a and including at least one of the first, second, and third coils 753a, 753b, and 753c.

According to various embodiments, the first, second, and/or third coil 753a, 753b, 753c that transmits and receives radio waves or generates a magnetic field may have various shapes according to a mounting space, but may have a circular or polygonal shape having vertical and horizontal symmetry. For example, the first, second, and/or third coil 753a, 753b, 753c may include a plurality of turns of a conductive line wound in a circular or polygonal shape on the base member.

According to various embodiments, at least a part of the first coil 753a having a first plurality of turns that passes through the first antenna unit 705a in the directions substantially perpendicular to one surface of the plate (for example, the back cover 402b of FIGS. 4A to 4C) may be disposed on the first antenna unit 705a. In another example, the second coil 753b having a second plurality of turns that is substantially parallel to the surface of the plate may be disposed on the first antenna unit 705a. In another example, the third coil 753c having a third plurality of turns that is substantially parallel to the surface of the plate may be disposed on the first antenna unit 705a. In another example, the second coil 753b may have a planar coil shape on the first antenna unit 705a to surround the third coil 753c.

According to various embodiments, the first coil 753a may have a helical coil shape to which the first and second antenna units 705a and 705b are connected.

According to various embodiments, at least a part of the first antenna unit 705a may be spaced apart from the second antenna unit 705b with the shielding structure 704 therebetween. The first antenna unit 705a and the second antenna unit 705b may be a flexible printed circuit board.

The electronic device, according to various embodiments of the present disclosure, may include the shielding structure 704 disposed between the first and second antenna units 705a and 705b to restrict interference caused by a magnetic field generated in the first and second antenna units 705a and 705b or to prevent the magnetic field from being offset by a metal material of the electronic device.

According to various embodiments, the shielding structure 704 may have a plurality of openings 706a, 706b, and 706c formed through opposite lateral edge portions thereof, and the first coil 753a may be connected with the first and second antenna units 705a and 705b through the plurality of openings 706a, 706b, and 706c. For example, the first coil 753a may pass through via holes 707b, which are formed through the second antenna unit 705b, via the openings 706a through via holes 707a, which are formed through the first antenna unit 705a, to form a helical antenna.

Referring to FIG. 7C, the first antenna unit 705a, the shielding structure 704, and the second antenna unit 705b may be arranged in sequence from top to bottom when the section is viewed with respect to the central portion.

According to various embodiments, one first coil 753a may be arranged in an X-type (for example, in a solenoid form) on the first antenna unit 705a and the second antenna unit 705b and may be connected with the control circuit (for example, the control circuit 1357 of FIG. 13) to transmit and receive radio waves or power and to generate a magnetic field. In another example, the first coil 753a may be designed such that the intensity of a magnetic field varies depending on regions.

According to various embodiments, the first coil 753a arranged in the X-type may be formed in a helical shape that passes through the first antenna unit 705a, turns about the second antenna unit 705b, and returns to the first antenna unit 705a. For example, the first coil 753a having the first plurality of turns may be arranged to be wound around a first axis (the Y-axis) in a first direction.

According to various embodiments, the first and second antenna units 705a and 705b may have the plurality of via holes 707a on one side thereof to guide the direction of the first coil 753a and to provide passages thereof. For example, the first coil 753a having passed through the first antenna unit 705a may pass through the second antenna unit 705b via the plurality of via holes 707a arranged on one side thereof, and the flow may be repeated as mentioned above.

According to various embodiments, the X-type magnetic field generating module may be suitable for an MST method. The first coil 753a arranged in the X-type by means of the shielding structure 704 disposed between the first and second antenna units 705a and 705b has no null point or region, and even though the first coil 753a is covered with a plate including metal (for example, the back cover 402b of FIGS. 4A to 4C) or a display, it is possible to ensure the performance of the magnetic field, avoiding the plate or display.

According to various embodiments, one second or third coil 753b or 753c may be arranged in a Y-type (for example, in a spiral form) on the first antenna unit 705a and the second antenna unit 705b and may be connected with the control circuit (for example, the control circuit 1357 of FIG. 13) to transmit and receive radio waves or power and to generate a magnetic field. In another example, the second and third coils may be designed such that the intensity of a magnetic field varies depending on regions.

According to various embodiments, the second coil 753b arranged in the Y-type may be formed in a rotary loop shape on the horizontal surface of the first antenna unit 705a. For example, the second coil 753b having the second plurality of turns may be arranged to be wound around a second axis (the Z-axis) in a second direction.

According to various embodiments, the third coil 753c arranged in the Y-type may be formed in a rotary loop shape on the horizontal surface of the second antenna unit 705b. For example, the third coil having a third plurality of turns may be arranged to be wound around the second axis (the Z-axis) in the second direction. The second coil 753b having the plurality of turns may be wound in the clockwise direction, and the third coil 753c having the plurality of turns may be wound in the counterclockwise direction.

According to various embodiments, only the second coil 753b may be disposed on the first antenna unit 705a, or only the third coil 753c may be disposed on the second antenna unit, to generate a magnetic field according to a current flowing through one coil. Furthermore, the intensity of the magnetic field may be amplified or decreased by disposing the second and third coils 753b and 753c on the first and second antenna units 705a and 705b, respectively, and making currents flow in the same direction or in opposite directions.

According to various embodiments, the Y-type magnetic field generating module may be suitable for an NFC or WPC method. Thanks to the shielding structure 704 disposed between the first or second antenna unit 705a or 705b and a metal member, a magnetic field generated according to the flow of a current through the second or third coil 753b or 753c arranged in the Y-type may prevent offsetting caused by surrounding metal.

According to various embodiments, the Y-type magnetic field generating module may perform near field communication and wireless charging through the conductive pattern (for example, the second or third coil 753b or 753c). For example, the Y-type magnetic field generating module may be connected to the second and/or third coil 753b, 753c through a non-illustrated switch member. For example, a matching circuit making the second and/or third coil 753b, 753c suitable for near field communication may be disposed on a line connecting the switch member and the second and/or third coil 753b, 753c.

Figure 7D:
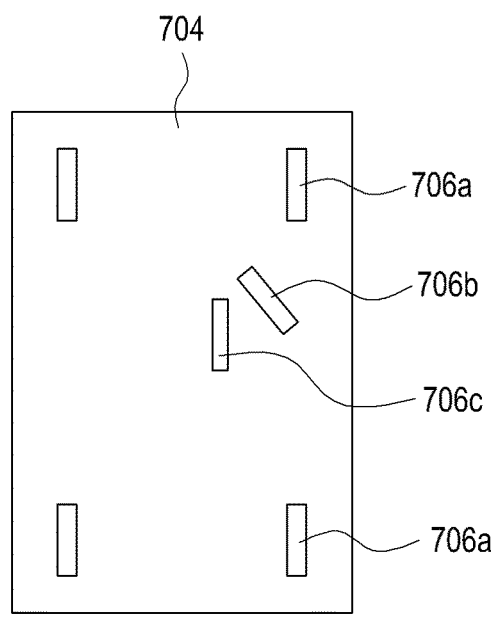

FIG. 7D illustrates the shielding structure 704 viewed from above, according to various embodiments. The shielding structure 704 may include the openings 706a, 706b, and 706c in paths along which the coils are arranged such that the first, second, and/or third coil 753a, 753b, 753c arranged on the first and second antenna units 705a and 705b may be connected with each other. For example, the openings 706a, 706b, and 706c may have an elongated slot shape arranged along the longitudinal direction of the shielding structure 704 and may be arranged on opposite sides of the shielding structure 704 with respect to the center thereof, or may be arranged in the central region of the shielding structure 704. The first coil 753a may extend from the first antenna unit 705a to the second antenna unit 705b, or from the second antenna unit 705b to the first antenna unit 705a, through the openings 706a having an elongated slot shape. According to another embodiment, the openings 706b and 706c disposed in the central region of the shielding structure 704 may provide passages through which the second and/or third coil 753b, 753c is connected with the connecting pieces 755.

According to various embodiments, the shielding structure 704 disposed between the first and second antenna units 705a and 705b may prevent a magnetic field from being offset by a metal material.

FIGS. 8A, 8B, 8C and 8D are diagrams illustrating various example shapes of an antenna unit and a shielding structure disposed in an electronic device according to various example embodiments. The antenna unit 805 of FIGS. 8A to 8D may be the antenna unit 405 of FIGS. 4A and 4B. The first and/or second coil 853a, 853b of FIGS. 8A to 8D may be the conductive pattern 406 of FIGS. 4A to 4C.

Figure 8A:
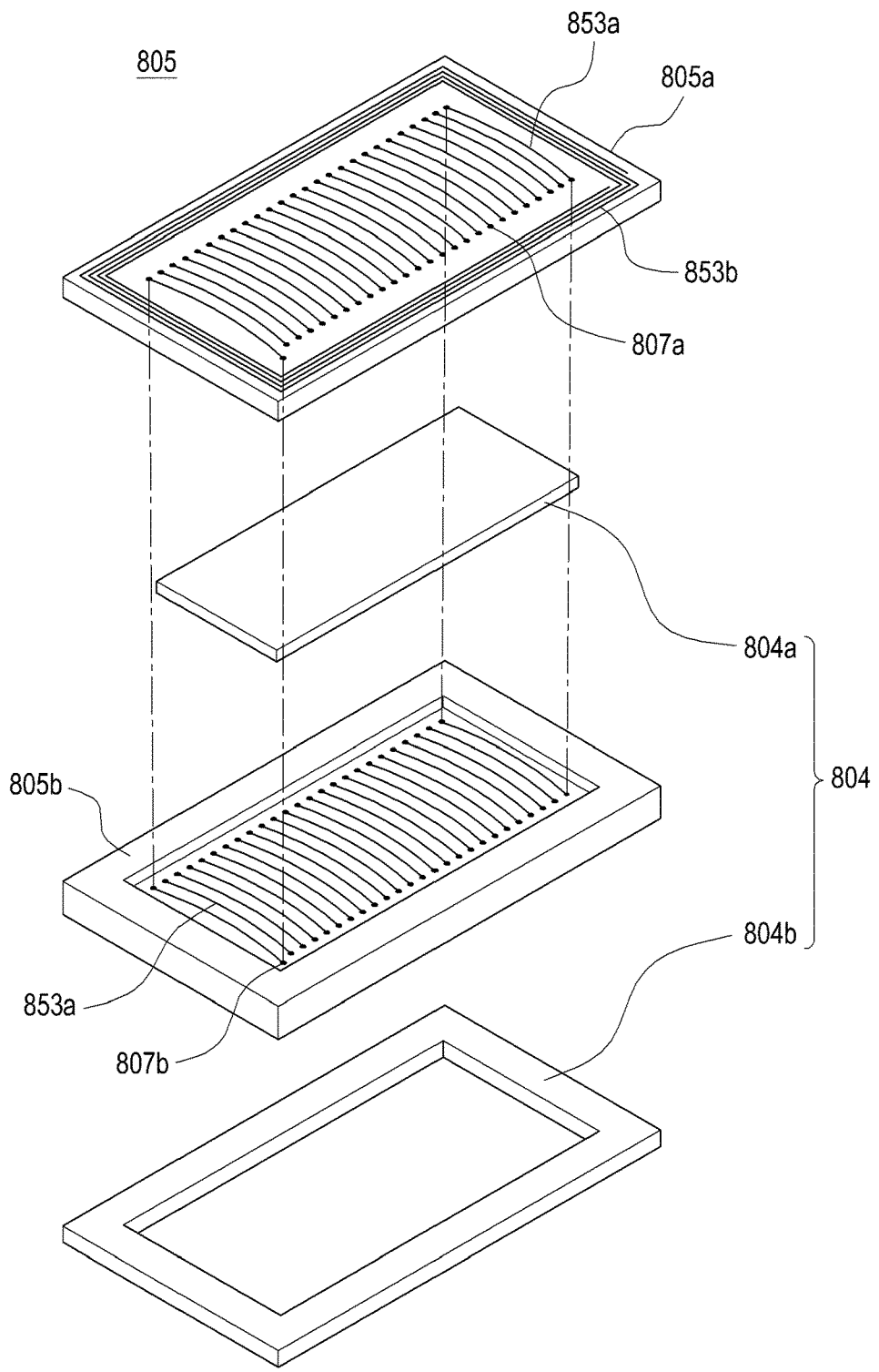
FIGS. 8A, 8B, 8C, 8D, 9A, 9B, 9C, 9D, 10A, 10B, 10C, 10D, 11A, 11B, 11C and 11D are diagrams illustrating various shapes of an antenna unit and a shielding structure disposed in an electronic device according to various example embodiments of the present disclosure.

As illustrated in FIG. 8A, the antenna unit 805 of the present disclosure may include a first antenna unit 805a and a second antenna unit 805b. The first antenna unit 805a may be disposed above the second antenna unit 805b and may include at least one of the first and second coils 853a and

853*b*. The second antenna unit 805*b* may be disposed below the first antenna unit 805*a* and may include at least one of the first and second coils 853*a* and 853*b*.

According to various embodiments, the first and/or second coil 853*a*, 853*b* that transmits and receives radio waves or generates a magnetic field may have various shapes according to a mounting space, but may have a circular or polygonal shape having vertical and horizontal symmetry. For example, the first and/or second coil 853*a*, 853*b* may include a plurality of turns of a conductive line wound in a circular or polygonal shape on a base member.

According to various embodiments, at least a part of the first coil 853*a* having a first plurality of turns that passes through the first antenna unit 805*a* in the directions substantially perpendicular to one surface of the plate (for example, the back cover 402*b* of FIGS. 4A to 4C) may be disposed on the first antenna unit 805*a*. In another example, the second coil 853*b* having a second plurality of turns that is substantially parallel to the surface of the plate may be disposed on the first antenna unit 805*a*. In another example, the second coil 853*b* may have a planar coil shape on the first antenna unit 805*a* to surround the first coil 853*a*.

According to various embodiments, at least a part of the first coil 853*a* having the first plurality of turns that passes through the second antenna unit 805*b* in the directions substantially perpendicular to one surface of the plate (for example, the back cover 402*b* of FIGS. 4A to 4C) may be disposed on the second antenna unit 805*b*.

According to various embodiments, the first coil 853*a* may have a helical coil shape to which the first and second antenna units 805*a* and 805*b* are connected.

According to various embodiments, at least a part of the first antenna unit 805*a* may make contact with the second antenna unit 805*b*, and the remaining part of the first antenna unit 805*a* may be spaced apart from the second antenna unit 805*b*. The first antenna unit 805*a* and/or the second antenna unit 805*b* may be a flexible printed circuit board.

The electronic device, according to various embodiments of the present disclosure, may include the shielding structure 804 disposed between the first and second antenna units 805*a* and 805*b*, or below the first and second antenna units 805*a* and 805*b*, to restrict interference caused by a magnetic field generated in the first and second antenna units 805*a* and 805*b* or to prevent the magnetic field from being offset by a metal material of the electronic device.

According to various embodiment, the shielding structure 804 may include a first shielding structure 804*a* disposed inside the path of the first coil 853*a* and a second shielding structure 804*b* disposed below the second coil 853*b*.

According to various embodiments, the first shielding structure 804*a* may use a material of a solenoid type that has magnetic permeability (for example, about 750 or more) advantageous for MST, and the second shielding structure 804*b* may be implemented using a material of a spiral type that has magnetic permeability (for example, about 250) advantageous for NFC.

According to various embodiments, an opening 806 may be disposed in the space between the first and second shielding structures 804*a* and 804*b*, and the first coil 853*a* may be connected with the first and second antenna units 805*a* and 805*b* through the opening 806. For example, the first coil 853*a* may pass through via holes 807*b*, which are formed through the second antenna unit 805*b*, via the opening 806 through via holes 807*a*, which are formed through the first antenna unit 805*a*, to form a helical antenna.

Figure 8B:
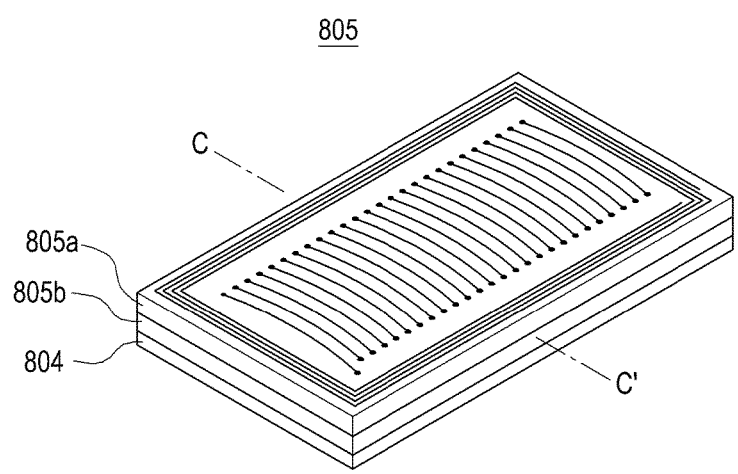
Figure 8C:
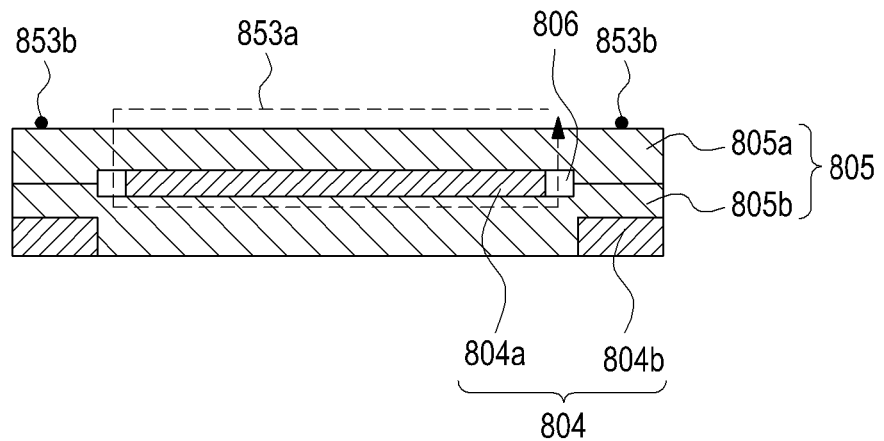

FIG. 8B is an assembled perspective view, and FIG. 8C is a sectional view taken along line C-C' of FIG. 8B. Referring to FIGS. 8A to 8C, the first antenna unit 805*a*, the first shielding structure 804*a*, and the second antenna unit 805*b* may be arranged in sequence from top to bottom when the section of the central region (FIG. 8C) of the stack structure of the antenna unit 805 including the conductive patterns and the shielding structure 804 is viewed. Furthermore, the first antenna unit 805*a*, the second antenna unit 805*b*, and the second shielding structure 804*b* may be arranged in sequence from top to bottom when the edge region (FIG. 8B) is viewed.

According to various embodiments, the reason why the arrangement of the central region and the edge region of the first antenna unit 805*a* differs from that of the second antenna unit 805*b* is because the second antenna unit 805*b* is configured with a flexible printed circuit board. For example, the central region of the second antenna unit 805*b* may be bent downward and disposed at the lowermost position, and the edge region of the second antenna unit 805*b* may be bent upward and disposed between the first antenna unit 805*a* and the second shielding structure 804*b*.

According to various embodiments, one first coil 853*a* may be arranged in an X-type (for example, in a solenoid form) on the first antenna unit 805*a* and the second antenna unit 805*b* and may be connected with a control circuit (for example, the control circuit 1357 of FIG. 13) to transmit and receive radio waves or power and to generate a magnetic field. In another example, the first coil 853*a* may be designed such that the intensity of a magnetic field varies depending on regions.

According to various embodiments, the first coil 853*a* arranged in the X-type may be formed in a helical shape that passes through the first antenna unit 805*a*, turns about the second antenna unit 805*b*, and returns to the first antenna unit 805*a*. For example, the first coil 853*a* having the first plurality of turns may be arranged to be wound around a first axis (the Y-axis) in a first direction.

According to various embodiments, the first and second antenna units 805*a* and 805*b* may have the plurality of via holes 807*a* on one side thereof to guide the direction of the first coil 853*a* and to provide passages thereof. For example, the first coil 853*a* having passed through the first antenna unit 805*a* may pass through the second antenna unit 805*b* via the plurality of via holes 807*a* of the first antenna unit 805*a*, and the flow may be repeated as mentioned above.

According to various embodiments, the plurality of via holes 807*a* may provide conductive passages of the different flexible printed circuit boards to help generate a magnetic field around the first coil 853*a*, and the intensity of the magnetic field may be controlled according to the gap between the plurality of via holes 807*a* (in the X-axis direction).

According to various embodiments, the X-type magnetic field generating module may be suitable for an MST method. According to various embodiments, one second coil 853*b* may be arranged in a Y-type (for example, in a spiral form) on the first antenna unit 805*a* and may be connected with the control circuit (for example, the control circuit 1357 of FIG. 13) to transmit and receive radio waves or power and to generate a magnetic field. In another example, the second coil 853*b* may be designed such that the intensity of a magnetic field varies depending on regions.

According to various embodiments, the second coil 853*b* arranged in the Y-type may be formed in a rotary loop shape on the horizontal surface of the first antenna unit 805*a*. For example, the second coil 853*b* having the second plurality of turns may be arranged to be wound around a second axis (the Z-axis) in a second direction.

According to various embodiments, the second shielding structure 804b may be disposed below the first or second antenna unit 805a or 805b to prevent a magnetic field from being offset by a metal material.

According to various embodiments, the Y-type magnetic field generating module may be suitable for an NFC method. Thanks to the shielding structure 804 disposed between the first or second antenna unit 805a or 805b and a metal member, a magnetic field generated according to the flow of a current through the second coil 853b arranged in the Y-type may prevent offsetting caused by surrounding metal.

Figure 8D:
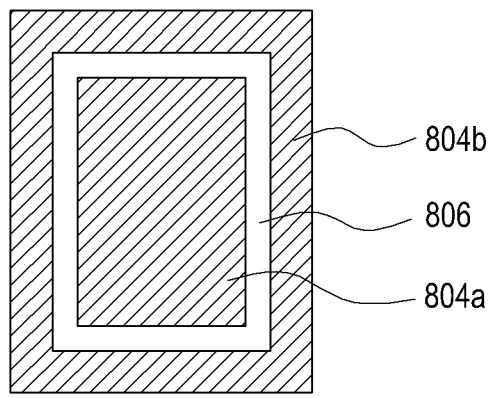

FIG. 8D is a top plan view of the first and second shielding structures 804a and 804b, according to various example embodiments of the present disclosure, when viewed from above.

According to various embodiments, the shielding structure 804 may include the first shielding structure 804a having a rectangular shape and disposed between the first and second antenna units 805a and 805b and the second shielding structure 804b having a ring shape and disposed below the second antenna unit 805b. The first and second shielding structures 804a and 804b may be disposed to be separated from each other and may comprise different layers. For example, when viewed from above (FIG. 8D), the second shielding structure 804b may be disposed to surround the first shielding structure 804a with a predetermined gap therebetween.

According to various embodiments, the opening 806 may be formed by means of the predetermined gap between the first and second shielding structures 804a and 804b, and the second antenna unit 805b may be disposed to pass through the opening 806. According to various embodiments, the opening 806 may have a rectangular ring shape and may provide a passage through which the first coils 853a disposed on the first and second antenna units 805a and 805b may be connected with each other. For example, the first coil 853a may extend from the first antenna unit 805a to the second antenna unit 805b, or from the second antenna unit 805b to the first antenna unit 805a, through the opening 806 having a cavity shape.

According to various embodiments, the first and second shielding structures 804a and 804b disposed between the first and second antenna units 805a and 805b may prevent a magnetic field from being offset by a metal material. However, the shape of the shielding structure 804 is not limited thereto, and the shielding structure 804 may be designed in various shapes to correspond to various shapes (such as a circular shape, a polygonal shape, etc.) of the antenna unit 805.

FIGS. 9A, 9B, 9C and 9D are diagrams illustrating various example shapes of an antenna unit and a shielding structure disposed in an electronic device according to various example embodiments. The antenna unit 905 of FIGS. 9A to 9D may be the antenna unit 405 of FIGS. 4A and 4B. The first and/or second coil 953a, 953b of FIGS. 9A to 9D may be the conductive pattern 406 of FIGS. 4A to 4C.

Figure 9A:
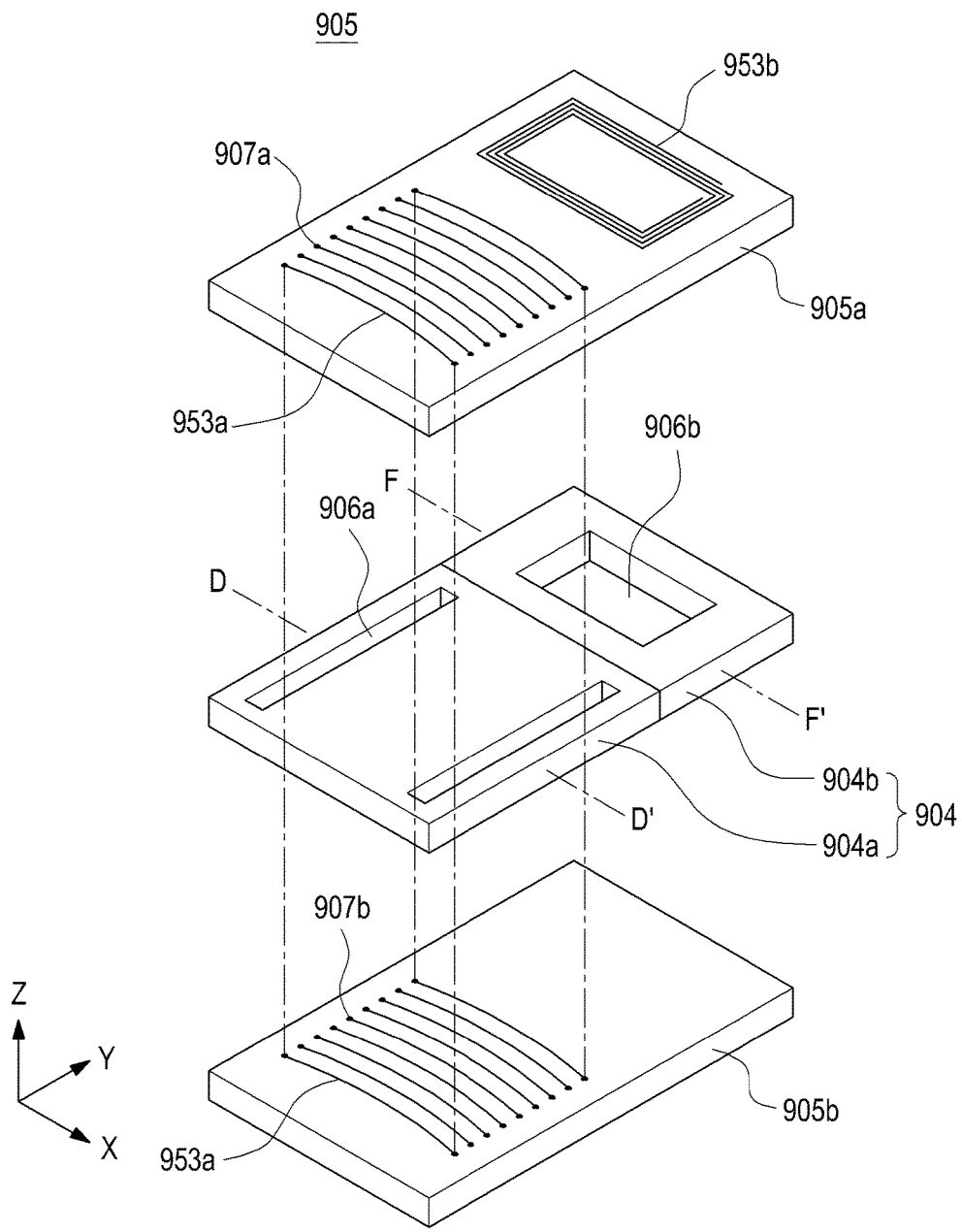

As illustrated in FIG. 9A, the antenna unit 905 of the present disclosure may include a first antenna unit 905a and a second antenna unit 905b. The first antenna unit 905a may be disposed above the second antenna unit 905b and may include at least one of the first and second coils 953a and 953b. The second antenna unit 905b may be disposed below the first antenna unit 905a and may include at least one of the first and second coils 953a and 953b. The first antenna unit 905a and the second antenna unit 905b may include a flexible printed circuit board.

According to various embodiments, the first and/or second coil 953a, 953b that transmits and receives radio waves or generates a magnetic field may have various shapes according to a mounting space, but may have a circular or polygonal shape having vertical and horizontal symmetry. For example, the first and/or second coil 953a, 953b may include a plurality of turns of a conductive line wound in a circular or polygonal shape on a base member.

According to various embodiments, at least a part of the first coil 953a having a first plurality of turns that passes through the first antenna unit 905a in the directions substantially perpendicular to one surface of the plate (for example, the back cover 402b of FIGS. 4A to 4C) may be disposed on the first antenna unit 905a. In another example, the second coil 953b having a second plurality of turns that is substantially parallel to the surface of the plate may be disposed on the first antenna unit 905a. In another example, the second coil 953b may have a planar coil shape on the first antenna unit 905a to surround the first coil 953a.

According to various embodiments, at least a part of the first coil 953a having the first plurality of turns that passes through the second antenna unit 905b in the directions substantially perpendicular to one surface of the plate (for example, the back cover 402b of FIGS. 4A to 4C) may be disposed on the second antenna unit 905b. According to various embodiments, the first coil 953a may have a helical coil shape to which the first and second antenna units 905a and 905b are connected.

According to various embodiments, the first antenna unit 905a may be spaced apart from the second antenna unit 905b.

The electronic device, according to various embodiments of the present disclosure, may include the shielding structure 904 disposed between the first and second antenna units 905a and 905b to restrict interference caused by a magnetic field generated in the first and second antenna units 905a and 905b or to prevent the magnetic field from being offset by a metal material of the electronic device.

According to various embodiment, the shielding structure 904 may include a first shielding structure 904a disposed inside the path of the first coil 953a and a second shielding structure 904b disposed below the second coil 953b. The first and second shielding structures 904a and 904b may be disposed side by side to face each other.

According to various embodiments, the first shielding structure 904a may use a material of a solenoid type that has magnetic permeability advantageous for MST, and the second shielding structure 904b may be implemented using a material of a spiral type that has magnetic permeability advantageous for NFC.

According to various embodiments, the first shielding structure 904a and the second shielding structure 904b may have openings 906a and an opening 906b, respectively, and the first coil 953a may be connected with the first and second antenna units 905a and 905b through the openings 906a. For example, the first coil 953a may be connected to via holes 907b, which are formed through the second antenna unit 905b, via the openings 906a through via holes 907a, which are formed through the first antenna unit 905a, to form a helical antenna.

Figure 9B:
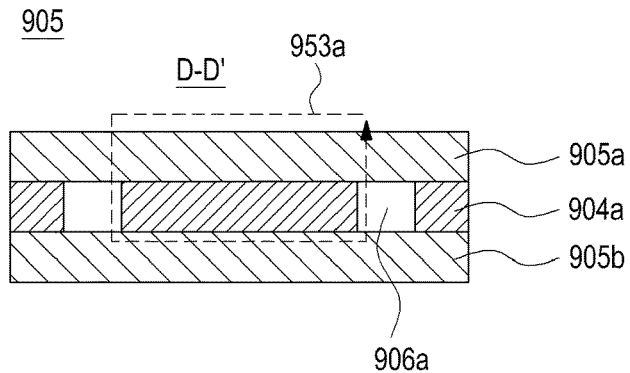
Figure 9C:
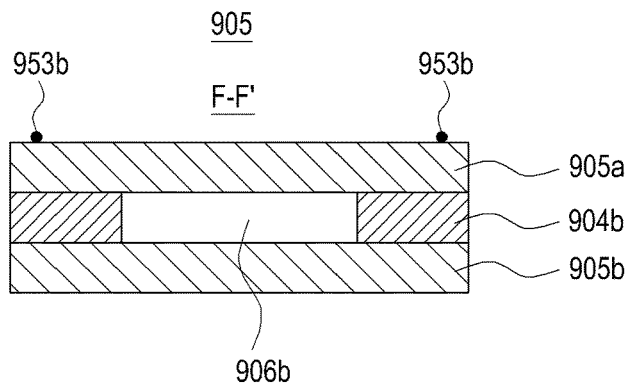

FIG. 9B is a sectional view taken along line D-D' of FIG. 9A, and FIG. 9C is a sectional view taken along line F-F' of FIG. 9A.

Referring to FIGS. 9A to 9C, the first antenna unit 905a, the first shielding structure 904a, and the second antenna unit 905b may be arranged in sequence from top to bottom when the sections of different regions (FIGS. 9B and 9C) of the stack structure of the antenna unit 905 including the conductive patterns and the shielding structure 904 are viewed. Furthermore, in FIG. 9C, the first antenna unit 905*a*, the second shielding structure 904*b*, and the second antenna unit 905*b* may be arranged in sequence from top to bottom.

According to various embodiments, one first coil 953*a* may be arranged in an X-type (for example, in a solenoid form) on the first antenna unit 905*a* and the second antenna unit 905*b* and may be connected with a control circuit (for example, the control circuit 1357 of FIG. 13) to transmit and receive radio waves or power and to generate a magnetic field. In another example, the first coil 953*a* may be designed such that the intensity of a magnetic field varies depending on regions.

According to various embodiments, the first coil 953*a* arranged in the X-type may be formed in a helical shape that passes through the first antenna unit 905*a*, turns about the second antenna unit 905*b*, and returns to the first antenna unit 905*a*. For example, the first coil 953*a* having the first plurality of turns may be arranged to be wound around a first axis (the Y-axis) in a first direction.

According to various embodiments, the first and second antenna units 905*a* and 905*b* may have the plurality of via holes 907*a* on one side thereof to guide the direction of the first coil 953*a* and to provide passages thereof. For example, the first coil 953*a* having passed through the first antenna unit 905*a* may pass through the second antenna unit 905*b* via the plurality of via holes 907*a* of the first antenna unit 905*a*, and the flow may be repeated as mentioned above.

According to various embodiments, the plurality of via holes 907*a* may provide conductive passages of the different flexible printed circuit boards to help generate a magnetic field around the first coil 953*a*, and the intensity of the magnetic field may be controlled according to the gap between the plurality of via holes 907*a* (in the X-axis direction).

According to various embodiments, one second coil 953*b* may be arranged in a Y-type (for example, in a spiral form) on the first antenna unit 905*a* and may be connected with the control circuit (for example, the control circuit 1357 of FIG. 13) to transmit and receive radio waves or power and to generate a magnetic field. In another example, the second coil 953*b* may be designed such that the intensity of a magnetic field varies depending on regions.

According to various embodiments, the second coil 953*b* arranged in the Y-type may be formed in a rotary loop shape on the horizontal surface of the first antenna unit 905*a*. For example, the second coil 953*b* having the second plurality of turns may be arranged to be wound around a second axis (the Z-axis) in a second direction.

According to various embodiments, the first and second shielding structures 904*a* and 904*b* may be disposed between the first and second antenna units 905*a* and 905*b* to prevent a magnetic field from being offset by a metal material.

According to various embodiments, the Y-type magnetic field generating module may be suitable for an NFC method. Thanks to the shielding structures 904 disposed between the first or second antenna unit 905*a* or 905*b* and a metal member, a magnetic field generated according to the flow of a current through the second coil 953*b* arranged in the Y-type may prevent offsetting caused by surrounding metal.

Figure 9D:
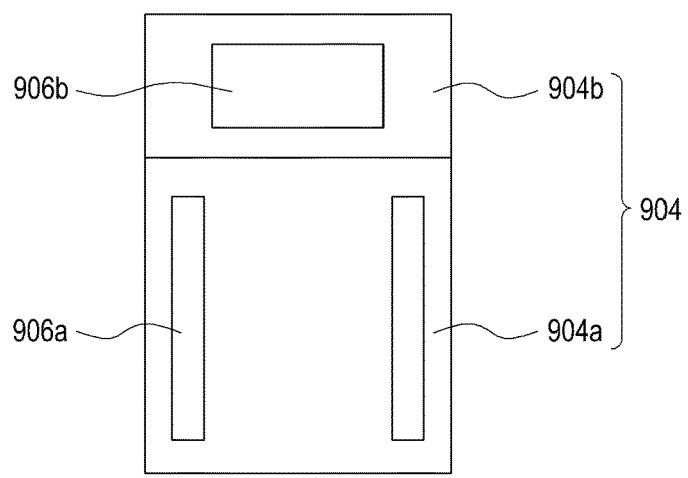

FIG. 9D is a top plan view of the first and second shielding structures 904*a* and 904*b*, according to various embodiments of the present disclosure, when viewed from above.

Referring again to FIGS. 9A to 9D, the shielding structure 904 may be disposed between the first and second antenna units 905*a* and 905*b*. According to various embodiments, the shielding structure 904 may include the first and second shielding structures 904*a* and 904*b* having a rectangular shape and disposed between the first and second antenna units 905*a* and 905*b*. The first and second shielding structures 904*a* and 904*b* may be disposed to face each other and may comprise the same layer.

The first shielding structure 904*a* may include the first openings 906*a* on one side thereof such that the first coil 953*a* may be arranged in a helical shape while passing through the first openings 906*a*. The first openings 906*a* may have an elongated slot shape and may be arranged on opposite sides of the first shielding structure 904*a* with respect to the center thereof along the longitudinal direction. The first coil 953*a* may extend from the first antenna unit 905*a* to the second antenna unit 905*b*, or from the second antenna unit 905*b* to the first antenna unit 905*a*, through the openings 906*a* having an elongated slot shape.

According to another embodiment, the second shielding structure 904*b* may include the second opening 906*b* having a rectangular shape in the central region thereof. The second coil 953*b* on the first antenna unit 905*a* may be arranged in a loop shape around the second opening 906*b*.

According to various embodiments, the first and second shielding structures 904*a* and 904*b* disposed between the first and second antenna units 905*a* and 905*b* may prevent a magnetic field from being offset by a metal material. However, the shape of the shielding structure 904 is not limited thereto, and the shielding structure 904 may be designed in various shapes to correspond to various shapes (such as a circular shape, a polygonal shape, etc.) of the antenna unit 905.

FIGS. 10A, 10B, 10C and 10D are diagrams illustrating various example shapes of an antenna unit and a shielding structure disposed in an electronic device according to various example embodiments. The antenna unit 1005 of FIGS. 10A to 10D may be the antenna unit 405 of FIGS. 4A and 4B. The first, second, and/or third coil 1053*a*, 1053*b*, 1053*c* of FIGS. 10A to 10D may be the conductive pattern 406 of FIGS. 4A to 4C.

Figure 10A:
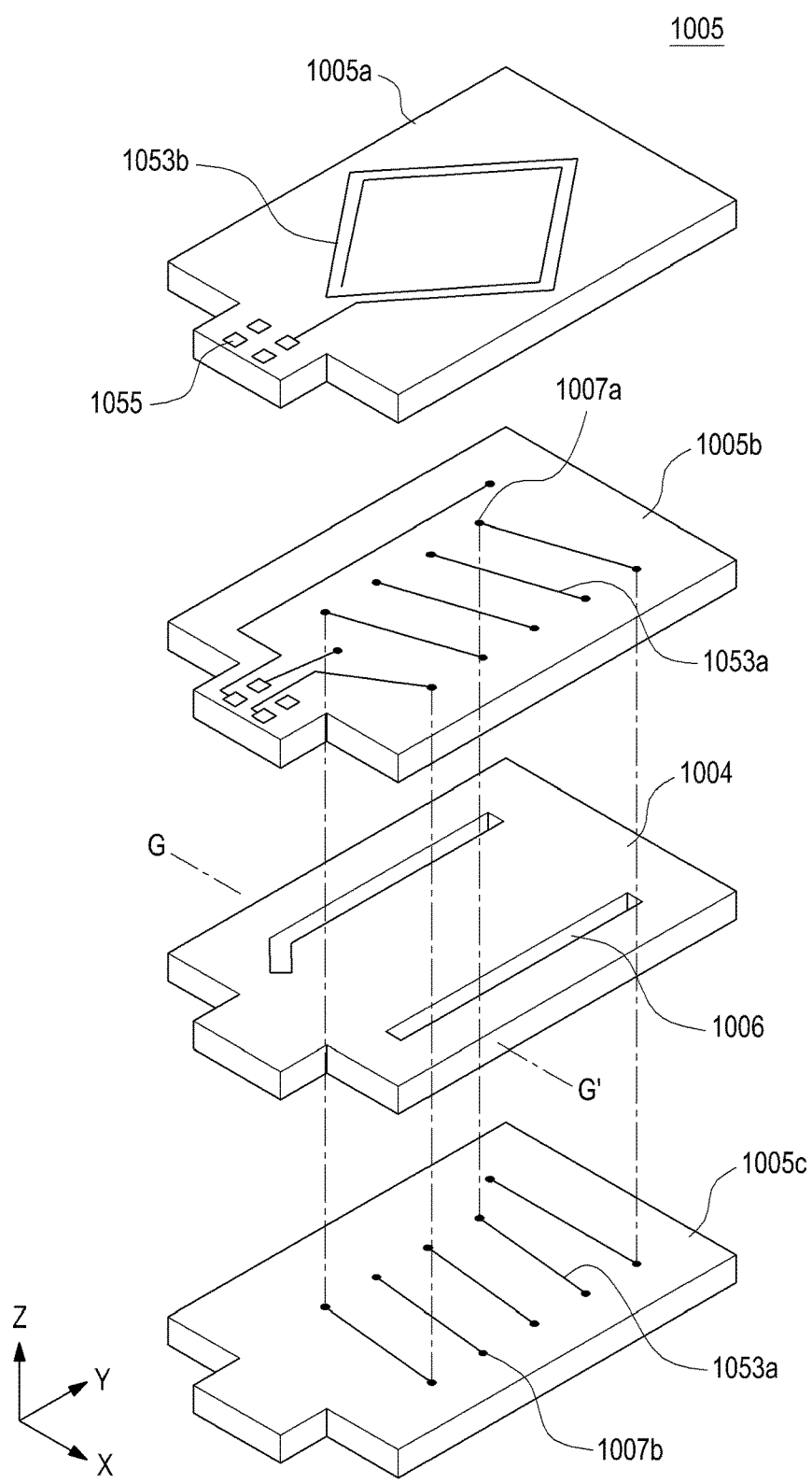

As illustrated in FIG. 10A, the antenna unit 1005 may include a first antenna unit 1005*a*, a second antenna unit 1005*b*, and a third antenna unit 1005*c*. The first antenna unit 1005*a* may be disposed above the second and/or third antenna unit 1005*b*, 1005*c* and may include at least one of the first and second coils 1053*a* and 1053*b*, and may further include connecting pieces 1055 (see, e.g., connecting pieces 555 in FIGS. 5A and 5B). The second antenna unit 1005*b* may be disposed between the first and third antenna unit 1005*a* and 1005*c* and may include at least one of the first and second coils 1053*a* and 1053*b*. The third antenna unit 1005*c* may be disposed below the first and/or second antenna unit 1005*a*, 1005*b* and may include at least one of the first and second coils 1053*a* and 1053*b*. The first, second, and/or third antenna unit 1005*a*, 1005*b*, 1005*c* may include a flexible printed circuit board.

According to various embodiments, the first and/or second coil 1053*a*, 1053*b* that transmits and receives radio waves or generates a magnetic field may have various shapes according to a mounting space, but may have a circular or polygonal shape having vertical and horizontal symmetry. For example, the first and/or second coil 1053*a*, 1053*b* may include a plurality of turns of a conductive line wound in a circular or polygonal shape on a base member.

According to various embodiments, the second coil 1053b having a second plurality of turns that is substantially parallel to the surface of the plate (for example, the back cover 402b of FIGS. 4A to 4C) may be disposed on the first antenna unit 1005a. In another example, the second coil 1053b may have a planar coil shape on the first antenna unit 1005a to surround the first coil 1053a.

According to various embodiments, at least a part of the first coil 1053a having a first plurality of turns that passes through the second antenna unit 1005b in the directions substantially perpendicular to one surface of the plate (for example, the back cover 402b of FIGS. 4A to 4C) may be disposed on the second antenna unit 1005b. According to various embodiments, at least a part of the first coil 1053a having the first plurality of turns that passes through the third antenna unit 1005c in the directions substantially perpendicular to one surface of the plate (for example, the back cover 402b of FIGS. 4A to 4C) may be disposed on the third antenna unit 1005c.

According to various embodiments, the first coil 1053a may have a helical coil shape to which the second and third antenna units 1005b and 1005c are connected. According to another embodiment, the first and second antenna units 1005a and 1005b may be disposed to face each other, and the second antenna unit 1005b may be disposed to be spaced apart from the third antenna unit 1005c.

The electronic device, according to various embodiments of the present disclosure, may include the shielding structure 1004 disposed between the second and third antenna units 1005b and 1005c to restrict interference caused by a magnetic field generated in the second and third antenna units 1005b and 1005c or to prevent the magnetic field from being offset by a metal material of the electronic device.

According to various embodiments, the shielding structure 1004 may have a plurality of openings 1006 formed through opposite lateral edge portions thereof, and the first coil 1053a may be connected with the second and third antenna units 1005b and 1005c through the plurality of openings 1006. For example, the first coil 1053a may be connected to via holes 1007b, which are formed through the third antenna unit 1005c, via the openings 1006 through via holes 1007a, which are formed through the second antenna unit 1005b, to form a helical antenna.

Figure 10B:
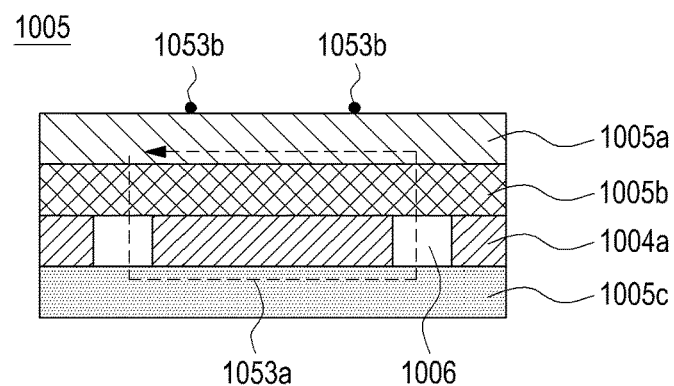

FIG. 10B illustrates a stack structure of the antenna unit 1005, which includes the conductive patterns, and the shielding structure 1004, according to various embodiments of the present disclosure. Referring to FIG. 10B, the section taken along line G-G' of FIG. 10A may be configured with the first antenna unit 1005a, the second antenna unit 1005b, the shielding structure 1004, and the third antenna unit 1005c that are arranged in sequence from top to bottom.

According to various embodiments, one second coil 1053b may be arranged in a Y-type (for example, in a spiral form) on the first antenna unit 1005a and may be connected with a control circuit (for example, the control circuit 1357 of FIG. 13) to transmit and receive radio waves or power and to generate a magnetic field. In another example, the second coil 1053b may be designed such that the intensity of a magnetic field varies depending on regions.

According to various embodiments, the second coil 1053b arranged in the Y-type may be formed in a rotary loop shape on the horizontal surface of the first antenna unit 1005a. For example, the second coil 1053b having the second plurality of turns may be arranged to be wound around a second axis (the Z-axis) in a second direction.

According to various embodiments, the first antenna unit 1005a may be implemented using a material that has magnetic permeability advantageous for an NFC method according to the Y-type magnetic field generating module.

According to various embodiments, one first coil 1053a may be arranged in an X-type (for example, in a solenoid form) on the second antenna unit 1005b and the third antenna unit 1005c and may be connected with the control circuit (for example, the control circuit 1257 of FIG. 12) to transmit and receive radio waves or power and to generate a magnetic field. In another example, the first coil 1053a may be designed such that the intensity of a magnetic field varies depending on regions.

According to various embodiments, the first coil 1053a arranged in the X-type may be formed in a helical shape that passes through the second antenna unit 1005b, turns about the third antenna unit 1005c, and returns to the second antenna unit 1005b. For example, the first coil 1053a having the first plurality of turns may be arranged to be wound around a first axis (the Y-axis) in a first direction.

According to various embodiments, the second and third antenna units 1005b and 1005c may have the plurality of via holes 1007a on one side thereof to guide the direction of the first coil 1053a and to provide passages thereof. For example, the first coil 1053a may pass through the third antenna unit 1005c via the plurality of via holes 1007a arranged on the second antenna unit 1005b, and the flow may be repeated as mentioned above.

According to various embodiments, the plurality of via holes 1007a may provide conductive passages of the different flexible printed circuit boards to help generate a magnetic field around the first coil 1053a, and the intensity of the magnetic field may be controlled according to the gap between the plurality of via holes 1007a (in the X-axis direction).

According to various embodiments, the X-type magnetic field generating module may be suitable for an MST method. The first coil 1053a arranged in the X-type by means of the shielding structure 1004 disposed between the second and third antenna units 1005b and 1005c has no null point or region, and even though the first coil 1053a is covered with a plate including metal (for example, the back cover 402b of FIGS. 4A to 4C) or a display, it is possible to ensure the performance of the magnetic field, avoiding the plate or display.

According to various embodiments, the shielding structure 1004 may be disposed between the second and third antenna units 1005b and 1005c to prevent a magnetic field from being offset by a metal material.

Figure 10C:
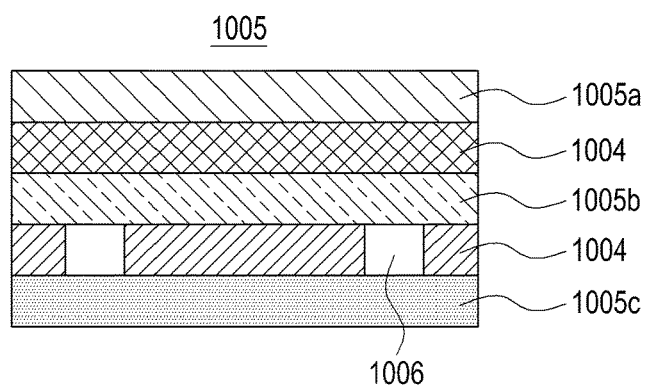

FIG. 10C illustrates a stack structure of the antenna unit 1005, which includes the conductive patterns, and the shielding structure 1004, according to various embodiments of the present disclosure. Referring to FIG. 10C, the section taken along line G-G' of FIG. 10A may be configured with the first antenna unit 1005a, the shielding structure 1004, the second antenna unit 1005b, the shielding structure 1004, and the third antenna unit 1005c that are arranged in sequence from top to bottom.

In this embodiment, another shielding structure 1004 may be additionally disposed between the first and second antenna unit 1005a and 1005b, and a magnetic field generated according to the flow of a current through the second coil 1053b arranged in the Y-type may prevent offsetting caused by surrounding metal.

Figure 10D:
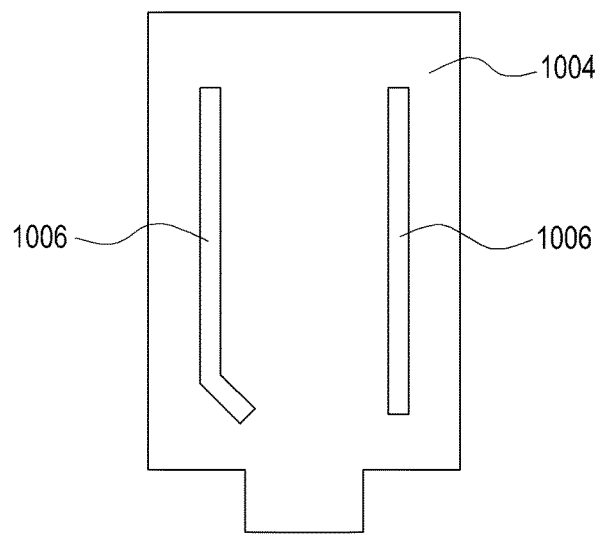

FIG. 10D illustrates the shielding structure 1004 viewed from above, according to various embodiments. The shielding structure 1004 may include the openings 1006 such that the first coils 1053a arranged on the second and third antenna units 1005b and 1005c may be connected with each other. The openings 1006 may be arranged parallel to the via holes 1007a of the second antenna unit 1005b and the via holes 1007b of the third antenna unit 1005c.

For example, the openings 1006 may have an elongated slot shape arranged along the longitudinal direction of the shielding structure 1004 and may be arranged on opposite sides of the shielding structure 1004 with respect to the enter thereof. The first coil 1035a may extend from the second antenna unit 1005b to the third antenna unit 1005c, or from the third antenna unit 1005c to the second antenna unit 1005b, through the openings 1006 having an elongated slot shape.

According to various embodiments, the shielding structure 1004 disposed between the second and third antenna units 1005b and 1005c to prevent a magnetic field from being offset by a metal material. However, the shape of the shielding structure 1004 is not limited thereto, and the shielding structure 1004 may be designed in various shapes to correspond to various shapes (such as a circular shape, a polygonal shape, etc.) of the antenna unit 1005.

FIGS. 11A, 11B, 11C and 11D are diagrams illustrating various example shapes of an antenna unit and a shielding structure disposed in an electronic device according to various example embodiments. The antenna unit 1105 of FIGS. 11A to 11D may be the antenna unit 405 of FIGS. 4A to 4C. The first, second, and/or third coil 1153a, 1153b, 1153c of FIGS. 11A to 11D may be the conductive pattern 406 of FIGS. 4A to 4C.

Figure 11A:
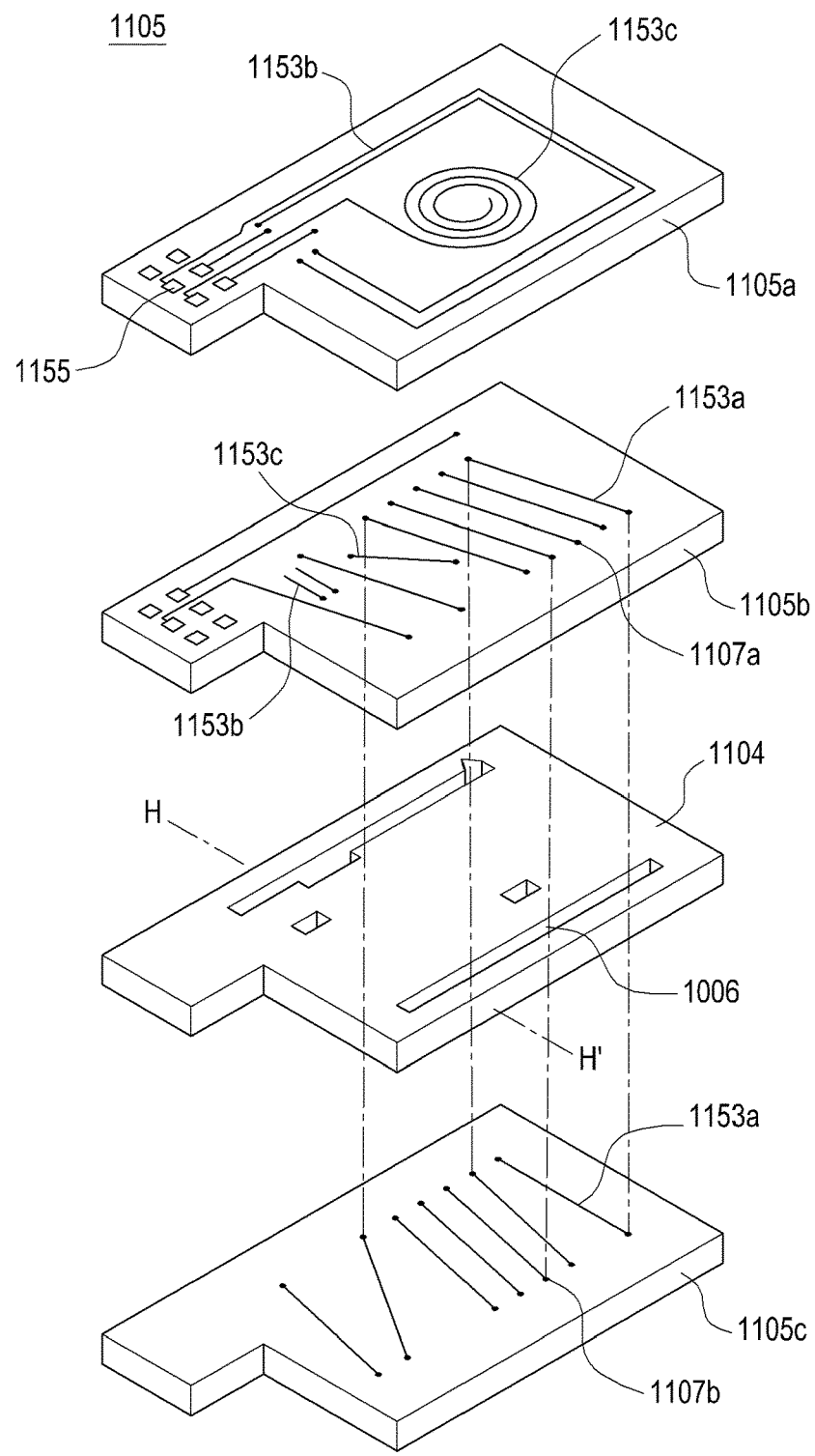

As illustrated in FIG. 11A, the antenna unit 1105 of the present disclosure may include a first antenna unit 1105a, a second antenna unit 1105b, and a third antenna unit 1105c. The first antenna unit 1105a may be disposed above the second and/or third antenna unit 1105b, 1105c and may include at least one of the first, second, and third coils 1153a, 1153b, and 1153c, and may further include connecting pieces 1155 (see, e.g, connecting pieces 555 in FIGS. 5A and 5B). The second antenna unit 1105b may be disposed between the first and third antenna unit 1105a and 1105c and may include at least one of the first, second, and third coils 1153a, 1153b, and 1153c. The third antenna unit 1105c may be disposed below the first and/or second antenna unit 1105a, 1105b and may include at least one of the first, second, and third coils 1153a, 1153b, and 1153c. The first, second, and/or third antenna unit 1105a, 1105b, 1105c may include a flexible printed circuit board.

According to various embodiments, the first, second, and/or third coil 1153a, 1153b, 1153c that transmits and receives radio waves or generates a magnetic field may have various shapes according to a mounting space, but may have a circular or polygonal shape having vertical and horizontal symmetry. For example, the first, second, and/or third coil 1153a, 1153b, 1153c may include a plurality of turns of a conductive line wound in a circular or polygonal shape on a base member.

According to various embodiments, the second coil 1153b having a second plurality of turns that is substantially parallel to the surface of the plate (for example, the back cover 402b of FIGS. 4A to 4C) may be disposed on the first antenna unit 1105a. In another example, the second coil 1153b may have a planar coil shape on the first antenna unit 1105a to surround the first coil 1153a. In another example, the third coil 1153c having a third plurality of turns that is substantially parallel to the surface of the plate may be disposed on the first antenna unit 1105a. In another example, the second coil 1153b may have a planar coil shape on the first antenna unit 1105a to surround the third coil 1153c.

According to various embodiments, at least a part of the first coil 1153a having a first plurality of turns that passes through the second antenna unit 1105b in the directions substantially perpendicular to one surface of the plate (for example, the back cover 402b of FIGS. 4A to 4C) may be disposed on the second antenna unit 1105b. According to various embodiments, at least a part of the first coil 1153a having the first plurality of turns that passes through the third antenna unit 1105c in the directions substantially perpendicular to one surface of the plate (for example, the back cover 402b of FIGS. 4A to 4C) may be disposed on the third antenna unit 1105c.

According to various embodiments, the first coil 1153a may have a helical coil shape to which the second and third antenna units 1105b and 1105c are connected. According to another embodiment, the first and second antenna units 1105a and 1105b may be disposed to face each other, and the second antenna unit 1105b may be disposed to be spaced apart from the third antenna unit 1105c.

The electronic device, according to various embodiments of the present disclosure, may include the shielding structure 1104 disposed between the second and third antenna units 1105b and 1105c to restrict interference caused by a magnetic field generated in the second and third antenna units 1105b and 1105c or to prevent the magnetic field from being offset by a metal material of the electronic device.

According to various embodiments, the shielding structure 1104 may have a plurality of openings 1106 formed through opposite lateral edge portions thereof, and the first coil 1153a may be connected with the second and third antenna units 1105b and 1105c through the plurality of openings 1106. For example, the first coil 1153a may be connected to via holes 1107b, which are formed through the third antenna unit 1105c, via the openings 1106 through via holes 1107a, which are formed through the second antenna unit 1105b, to form a helical antenna.

Figure 11B:
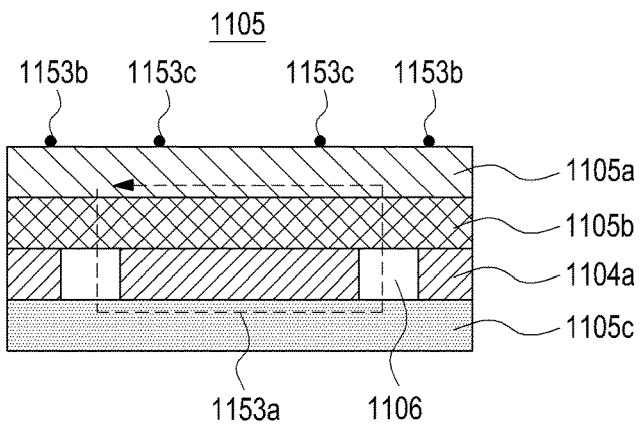

FIG. 11B illustrates a stack structure of the antenna unit 1105, which includes the conductive patterns, and the shielding structure 1104, according to various embodiments of the present disclosure. Referring to FIG. 11B, the section taken along line H-H' of FIG. 11A may be configured with the first antenna unit 1105a, the second antenna unit 1105b, the shielding structure 1104, and the third antenna unit 1105c that are arranged in sequence from top to bottom.

According to various embodiments, the second and/or third coil 1153b, 1153c may be arranged in a Y-type (for example, in a spiral form) on the first antenna unit 1105a and may be connected with a control circuit (for example, the control circuit 1357 of FIG. 13) to transmit and receive radio waves or power and to generate a magnetic field. In another example, the second and/or third coil 1153b, 1153c may be designed such that the intensity of a magnetic field varies depending on regions.

According to various embodiments, the second and/or third coil 1153b, 1153c arranged in the Y-type may be formed in a rotary loop shape on the horizontal surface of the first antenna unit 1105a. For example, the second coil 1153b having a plurality of turns may be arranged to be wound around a second axis (the Z-axis) in a second direction. For example, the third coil 1153c having a plurality of turns may be disposed inside the second coil and wound around the second axis (the Z-axis) in the second direction.

According to various embodiments, the first antenna unit 1105a may be implemented using a material that has magnetic permeability advantageous for an NFC or WPC method according to the Y-type magnetic field generating module.

For example, if the control circuit includes an NFC module, the second coil 1153b may be connected to the NFC module to perform a near field communication function. In another example, if the control circuit includes a WPC module, the third coil 1153c may be connected to the WPC module to perform a wireless charging function.

According to various embodiments, one first coil 1153a may be arranged in an X-type (for example, in a solenoid form) on the second antenna unit 1105b and the third antenna unit 1105c and may be connected with the control circuit (for example, the control circuit 1257 of FIG. 12) to transmit and receive radio waves or power and to generate a magnetic field. In another example, the first coil 1153a may be designed such that the intensity of a magnetic field varies depending on regions.

According to various embodiments, some regions of the second and/or third coil 1153b, 1153c that are electrically connected with the second and/or third coil 1153b, 1153c of the first antenna unit 1105a through the via holes 1107b may be arranged in some areas of the second antenna unit 1105b.

According to various embodiments, the first coil 1153a arranged in the X-type may be formed in a helical shape that passes through the second antenna unit 1105b, turns about the third antenna unit 1105c, and returns to the second antenna unit 1105b. For example, the first coil 1153a having a first plurality of turns may be arranged to be wound around a first axis (the Y-axis) in a first direction.

According to various embodiments, the second and third antenna units 1105b and 1105c may have the plurality of via holes 1107a on one side thereof to guide the direction of the first coil 1153a and to provide passages thereof. For example, the first coil 1153a may pass through the third antenna unit 1105c via the plurality of via holes 1107a arranged on the second antenna unit 1105b, and the flow may be repeated as mentioned above.

According to various embodiments, the plurality of via holes 1107a may provide conductive passages of the different flexible printed circuit boards to help generate a magnetic field around the first coil 1153a, and the intensity of the magnetic field may be controlled according to the gap between the plurality of via holes 1107a (in the X-axis direction). According to various embodiments, the shielding structure 1104 may be disposed between the second and third antenna units 1105b and 1105c to prevent a magnetic field from being offset by a metal material.

Figure 11C:
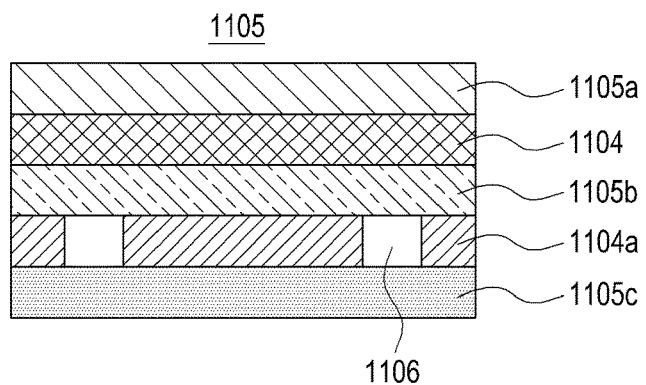

FIG. 11C illustrates a stack structure of the antenna unit 1105, which includes the conductive patterns, and the shielding structure 1104, according to various embodiments of the present disclosure. Referring to FIG. 11C, the section taken along line H-H' of FIG. 11A may be configured with the first antenna unit 1105a, the shielding structure 1104, the second antenna unit 1105b, the shielding structure 1104, and the third antenna unit 1105c that are arranged in sequence from top to bottom.

In this embodiment, another shielding structure 1104 may be additionally disposed between the first and second antenna unit 11105a and 1105b, and a magnetic field generated according to the flow of a current through the second coil 1153b arranged in the Y-type may prevent offsetting caused by surrounding metal.

Figure 11D:
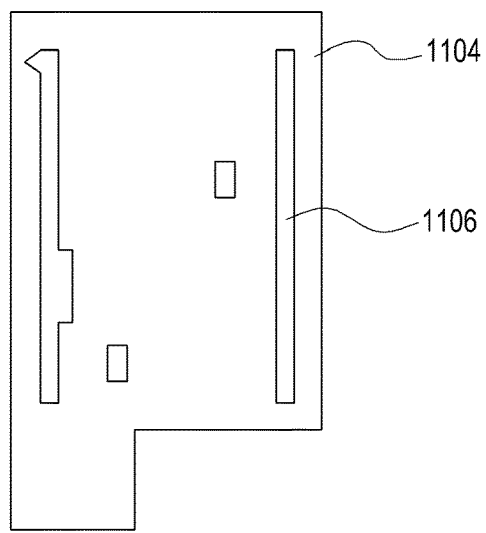

FIG. 11D illustrates the shielding structure 1104 viewed from above, according to various embodiments. The shielding structure 1104 may include the openings 1106 such that the first coils 1153a arranged on the second and third antenna units 1105b and 1105c may be connected with each other. The openings may be arranged parallel to the via holes 1107a of the second antenna unit 1105b and the via holes of the third antenna unit 1105c.

For example, the openings 1106 may have an elongated slot shape arranged along the longitudinal direction of the shielding structure 1104 and may be arranged on opposite sides of the shielding structure 1104 with respect to the center thereof. The first coil 1153a may extend from the second antenna unit 1105b to the third antenna unit 1105c, or from the third antenna unit 1105c to the second antenna unit 1105b, through the openings 1106 having an elongated slot shape.

According to various embodiments, the shielding structure 1104 disposed between the second and third antenna units 1105b and 1105c to prevent a magnetic field from being offset by a metal material. However, the shape of the shielding structure 1104 is not limited thereto, and the shielding structure 1104 may be designed in various shapes to correspond to various shapes (such as a circular shape, a polygonal shape, etc.) of the antenna unit 1105.

Figure 12:
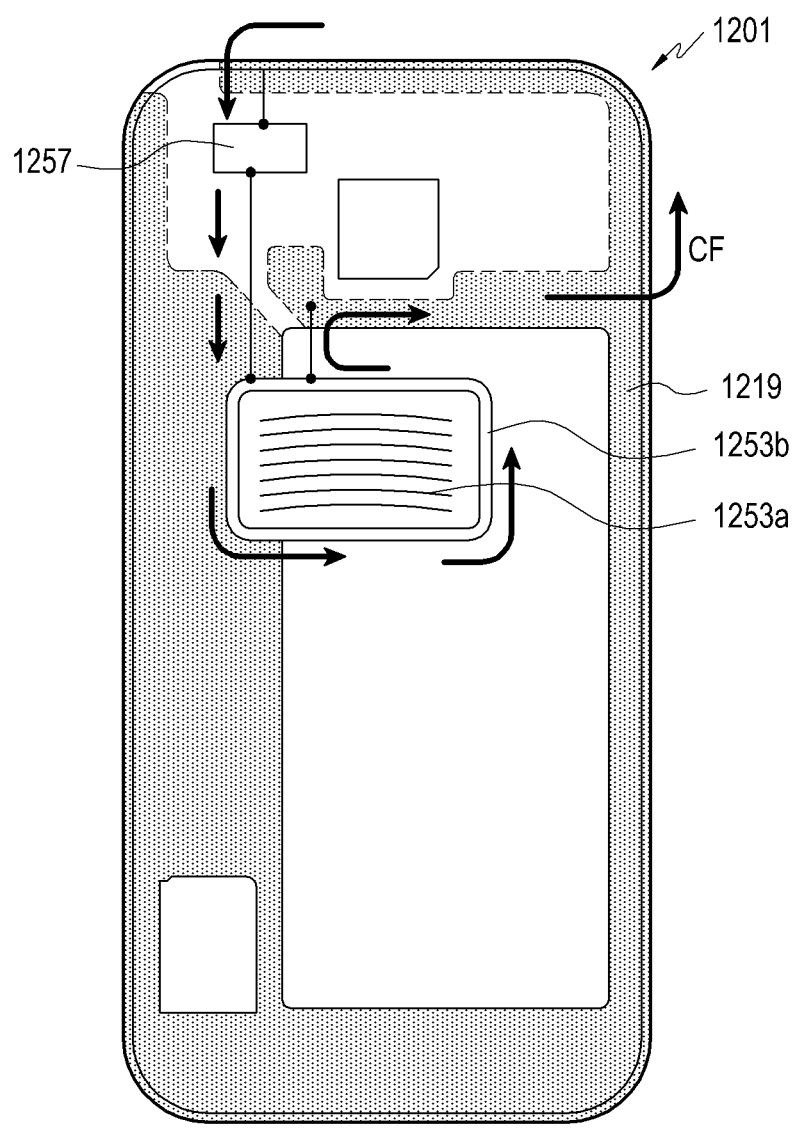
FIG. 12 is a diagram illustrating an example application of a conductive pattern of an electronic device according to various example embodiments of the present disclosure.

FIG. 12 is diagram illustrating an example application of a conductive pattern of an electronic device (for example, the electronic device 101, 201, 400 illustrated in FIG. 1, 2, 4a) according to various example embodiments of the present disclosure.

Referring to FIG. 12, conductive materials disposed on the housing 1201 (for example, the housing 501 of FIG. 5A) of the electronic device and conductive patterns 1253a and 1253b (for example, the first and second coils 553a and 553b of FIG. 5B) may be connected to create a current flow (CF) path.

According to various embodiments, at least a part (hereinafter, a conductive member 1219) of the housing 1201 may be made of a conductive material. One point of the conductive member 1219 may be connected to the control circuit 1257, and another point may be connected to one of the conductive patterns, for example, the conductive pattern 1253a, 1253b. For example, the control circuit 1257 may apply a signal current to the conductive pattern 1253a, 1253b, and the current flow (CF) path may be created along the conductive pattern 1253a, 1253b and a part of the conductive pattern 1219 by the signal current applied to the conductive pattern 1253a, 1253b. For example, the conductive pattern 1253a, 1253b and the part of the conductive member 1219 may be formed to be a planar coil. According to various embodiments, the conductive member 1219 may include a non-illustrated slit across a part thereof and thus may have an electrical characteristic, such as an electrical length (for example, an electrical length corresponding to a resonant frequency) or inductance.

According to another embodiment, a loop antenna (coil antenna) may have a shape that connects a pattern implemented on a flexible printed circuit board (FPCB) and at least one portion of a mechanical part of a terminal. At least a part of the external appearance of the terminal may include a conductive material (for example, metal) through which a current can flow. In another example, in a case where at least a part of the external appearance of the terminal is separated (is not electrically connected), the part may be electrically connected through a connecting element. The connecting element may be a passive element (such as an inductor or a capacitor) or a structure including a conductive material.

In FIG. 12, the current flow (CF) path is illustrated as being oriented in one direction (for example, in the counterclockwise direction), but may be oriented in a different direction from that illustrated in FIG. 12 according to a signal current applied by the control circuit 1257. In another example, the current flow path and the direction thereof may be more diversely changed in consideration of the location where a conductive material is distributed on the housing 1201.

Figure 13:
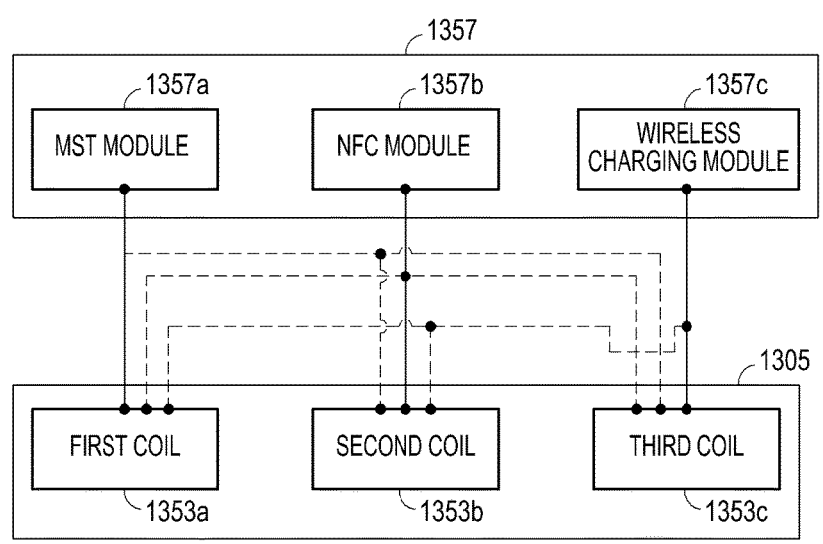
FIG. 13 is a block diagram illustrating an example configuration of a conductive pattern and a control circuit in an electronic device according to various example embodiments of the present disclosure.

FIG. 13 is a block diagram illustrating an example configuration of a conductive pattern (the first, second, and/or third coil 553*a*, 553*b*, 553*c* of FIG. 5B) and a control circuit 1357 in an electronic device (for example, the electronic device 101, 201, 400 illustrated in FIG. 1, 2, 4A) according to one of various embodiments of the present disclosure.

Referring to FIG. 13, the control circuit 1357 may include at least one of an MST module 1357*a*, an NFC module 1357*b*, and a wireless charging module 1357*c*. The MST module 1357*a*, the NFC module 1357*b*, and/or the wireless charging module 1357*c* may individually have an independent integrated circuit chip form, and two or three modules may be integrated into one integrated circuit chip form. For example, in a specific embodiment of the present disclosure, the MST module 1357*a*, the NFC module 1357*b*, and the wireless charging module 1357*c* are illustrated as being integrated into the control circuit 1357. However, it should be noted that this does not mean an integrated circuit chip into which the MST module 1357*a*, the NFC module 1357*b*, and the wireless charging module 1357*c* are integrated. For example, an antenna unit 1305 including the conductive pattern may include at least one of first, second, and third coils 1353*a*, 1353*b*, and 1353*c*.

According to various embodiments, the MST module 1357*a* may generate magnetic flux through the antenna unit 1305. For example, the MST module 1357*a* may generate magnetic flux through at least one of the first, second, and third coils 1353*a*, 1353*b*, and 1353*c* to transmit information (for example, payment information) to an external device (for example, a magnetic POS reader). For example, the electronic device (for example, the electronic device 101 of FIG. 1) may periodically transmit an MST signal including payment information several times through the MST module. For example, the MST signal may include payment information included in at least a part of a card.

According to various embodiments, the MST module 1357*a* may be connected to the first, second, and/or third coil 1353*a*, 1353*b*, 1353*c* through a non-illustrated switch member. For example, a matching circuit for generating magnetic flux using the first, second and/or third coil 1353*a*, 1353*b*, 1353*c* may be disposed on a line that connects the switch member and the first, second, and/or third coil 1353*a*, 1353*b*, 1353*c*.

According to various embodiments, if the MST module 1357*a* has been connected to the third coil 1353*c* through the switch member, the wireless charging module 1357*c* or the NFC module 1357*b* may be controlled not to be connected to the third coil 1353*c*. For example, if the third coil 1353*c* has been connected to the NFC module 1357*b* through a switch member, the MST module 1357*a* may be controlled to be connected to the first coil 1353*a* and/or the second coil 1353*b* when a condition to generate magnetic flux occurs. As described above, the control circuit 1357 may appropriately select and operate one of the first, second, and third coils 1353*a*, 1353*b*, and 1353*c* according to an operating condition or instruction generated by the electronic device.

According to various embodiments, the NFC module 1357*b* may perform near field communication through the antenna unit 1305. For example, the NFC module 1357*b* may be connected to the first, second, and/or third coil 1353*a*, 1353*b*, 1353*c* through a non-illustrated switch member. For example, a matching circuit for making the first, second, and/or third coil 1353*a*, 1353*b*, 1353*c* suitable for near field communication may be disposed on a line that connects the switch member and the first, second, and/or third coil 1353*a*, 1353*b*, 1353*c*.

According to various embodiments, the wireless charging module 1357*c* may wirelessly receive power through the antenna unit 1305 to charge the battery (for example, the battery 443 of FIG. 4A). For example, the wireless charging module 1357*c* may be connected to the first, second, and/or third coil 1353*a*, 1353*b*, 1353*c* individually or selectively through a non-illustrated switch member. For example, the switch module may be disposed between the wireless charging module 1357*c* and the first, second, and/or third coil 1353*a*, 1353*b*, 1353*c* to connect at least one of the first, second, and third coils 1353*a*, 1353*b*, and 1353*c* to the wireless charging module 1357*c*. For example, a matching circuit for making the first, second, and/or third coil 1353*a*, 1353*b*, 1353*c* suitable for wireless power transmission/reception may be disposed on a line that connects the switch member and the first, second, and/or third coil 1353*a*, 1353*b*, 1353*c*.

An electronic device, according to an example embodiment of the present disclosure, includes: a housing; an antenna unit disposed inside the housing and including a conductive pattern configured to generate a magnetic field; a plate comprising at least a part of the housing and including a material through which at least a part of the magnetic field generated by the conductive pattern can pass; and a control circuit configured to transmit at least one piece of payment information to an external device using the conductive pattern, wherein the antenna unit including the conductive pattern may include: a first coil having a first plurality of turns that passes through the antenna unit in directions substantially perpendicular to one surface of the plate; and a second coil having a second plurality of turns that is substantially parallel to the surface of the plate, and a shielding structure comprising a shielding material may be disposed inside the first coil or below the second coil.

According to an example embodiment of the present disclosure, the first coil having the plurality of turns may be wound around a first axis in a first direction, and the second coil having the plurality of turns may be wound around a second axis in a second direction, which is different from the first axis.

According to an example embodiment of the present disclosure, the first and second axes may be orthogonal to each other.

According to an example embodiment of the present disclosure, the antenna unit may include: a first antenna unit including the first or second coil; and a second antenna unit disposed below the first antenna unit and including the first or second coil.

According to an example embodiment of the present disclosure, the shielding structure may include at least one opening in a path of the first coil, and the first coil may be connected with the first and second antenna units through the opening.

According to an example embodiment of the present disclosure, the first or second antenna unit may have a plurality of via holes formed through opposite edge portions thereof, and the first coil may extend through the plurality of via holes so as to be connected with the first or second antenna unit.

According to an example embodiment of the present disclosure, the antenna unit including the conductive pattern may include a third coil having a third plurality of turns that is substantially parallel to the surface of the plate, and the third coil may be disposed to be surrounded by the second coil.

According to an example embodiment of the present disclosure, the shielding structure may include a first shielding structure disposed above the second antenna unit and a second shielding structure forming a different layer from the first shielding structure, wherein an open space may be formed between the first and second shielding structures, and at least a part of the second antenna unit may pass through the open space.

According to an example embodiment of the present disclosure, the first shielding structure may be disposed inside the second shielding structure when viewed from above.

According to an example embodiment of the present disclosure, the shielding structure may include a first shielding structure disposed above the second antenna unit and a second shielding structure forming the same layer along with the first shielding structure, and the first and second shielding structures may be disposed to face each other and may include openings having different shapes inside, respectively.

According to an example embodiment of the present disclosure, one of the first and second coils may surround the other when viewed from above the first or second antenna unit.

According to an example embodiment of the present disclosure, at least a part of the first antenna unit may be disposed to make contact with the second antenna unit, and the remaining part of the first antenna unit may be disposed to be spaced apart from the second antenna unit while facing the same.

According to an example embodiment of the present disclosure, the antenna unit may further include a third antenna unit disposed below the second antenna unit and including the first or second coil, and the shielding structure may be disposed between the second and third antenna units.

According to an example embodiment of the present disclosure, the first antenna unit may include a third coil having a third plurality of turns that is substantially parallel to the surface of the plate, and the third coil may be disposed to be surrounded by the first or second coil. According to an example embodiment of the present disclosure, the first or second antenna unit may include a flexible printed circuit board.

According to an example embodiment of the present disclosure, the control circuit may further include a wireless charging module connected to one of the first and second coils.

According to an example embodiment of the present disclosure, the control circuit may further include a Near Field Communication (NFC) module connected to one of the first and second coils, and at least one of the first and second coils may be alternately connected with the wireless charging module and the NFC module.

According to an example embodiment of the present disclosure, the control circuit may further include a Magnetic Secure Transmission (MST) module connected to one of the first and second coils, and at least one of the first and second coils may be alternately connected with the wireless charging module and the MST module.

According to an example embodiment of the present disclosure, the control circuit may transmit at least one piece of payment information through a Near Field Communication (NFC) module or a Magnetic Secure Transmission (MST) module using at least one of the first and second coils.

An electronic device, according to an example embodiment of the present disclosure, includes: a plurality of antenna units including a first coil and a second coil; a Magnetic Secure Transmission (MST) module comprising MST circuitry connected with the first coil; a Near Field Communication (NFC) module comprising NFC circuitry connected with the second coil; and a shielding structure comprising shielding material disposed inside the first coil or below the second coil.

According to an example embodiment of the present disclosure, the plurality of antenna units may further include a third coil, and the third coil connected with a magnetic induction type (WPC) module may include a plurality of turns that differ from those of the first or second coil and may be disposed inside the first or second coil so as to be surrounded thereby.

According to an example embodiment of the present disclosure, the antenna unit may include first and second antenna units that form different layers; the first antenna unit may be disposed above the second antenna unit; and a plurality of via holes formed on opposite sides of the first antenna unit so as to be spaced apart from and parallel to each other may guide the direction of the first coil.

According to an example embodiment of the present disclosure, the second coil may be disposed to surround the first coil in a flexible antenna unit in one layer, and the first coil may be disposed to surround the third coil in a flexible antenna unit in another layer.

According to an example embodiment of the present disclosure, the first and second coils may not at least partially overlap each other and may be arranged in a helical form in orthogonal directions when viewed from above the antenna unit.

An antenna device, according to an example embodiment of the present disclosure, includes: a substrate; a first coil having a first plurality of turns that is substantially perpendicular to one surface of the substrate; a second coil having a second plurality of turns that is substantially parallel to the surface of the substrate; and a shielding structure disposed inside the first coil or below the second coil.

While the present disclosure has been illustrated and described with reference to various example embodiments thereof, it will be apparent to those skilled in the art that the present disclosure is not limited to these embodiments, and various changes in form and details may be made therein without departing from the spirit and scope of the present disclosure as defined by the appended claims and their equivalents.

What is claimed is:
1. An electronic device comprising:
a housing;
an antenna unit disposed inside the housing and comprising a conductive pattern configured to generate a magnetic field;
a plate comprising at least a part of the housing and comprising a material through which at least a part of the magnetic field generated by the conductive pattern can pass; and
a control circuit configured to transmit at least one piece of payment information to an external device using the conductive pattern,
wherein the antenna unit comprising the conductive pattern comprises: a first coil having a first plurality of turns that passes through the antenna unit in directions substantially perpendicular to one surface of the plate; and a second coil having a second plurality of turns that is substantially parallel to the one surface of the plate, a shielding structure comprising a shielding material, wherein the antenna unit comprises a first antenna unit comprising a plane in which part of the first coil, and the second coil, are disposed, and a second antenna unit disposed below the first antenna unit and comprising another plane in which another part of the first coil is located, wherein the shielding structure comprises: a first shielding structure disposed above the second antenna unit and disposed at least partially inside the first coil, and a second shielding structure being a different layer from the first shielding structure and disposed below the second coil, wherein an open space is disposed between the first and second shielding structures, and at least a part of the second antenna unit passes through the open space.

2. The electronic device of claim 1, wherein the plurality of turns of the first coil are wound around a first axis in a first direction, and the plurality of turns of the second coil are wound around a second axis in a second direction, wherein the second axis is different from the first axis.

3. The electronic device of claim 2, wherein the first and second axes are orthogonal to each other.

4. The electronic device of claim 1, wherein the first antenna unit or the second antenna unit includes a plurality of via holes formed through opposite edge portions thereof, and the first coil extends through the plurality of via holes to be connected with the first antenna unit or the second antenna unit.

5. The electronic device of claim 4, wherein the antenna unit including the conductive pattern comprises a third coil having a third plurality of turns substantially parallel to the surface of the plate, and the third coil is disposed to be surrounded by the second coil.

6. The electronic device of claim 1,
wherein the first shielding structure is disposed inside the second shielding structure when viewed from above the shielding structure.

7. The electronic device of claim 1, wherein at least a part of the first antenna unit is disposed to make contact with the second antenna unit, and a remaining part of the first antenna unit is disposed to be spaced apart from the second antenna unit while facing the second antenna unit.

8. The electronic device of claim 1, wherein the antenna unit further comprises:
a third antenna unit disposed below the second antenna unit and comprising the first or second coil,
wherein the shielding structure is disposed between the second and third antenna units.

9. The electronic device of claim 8, wherein the first antenna unit comprises a third coil having a third plurality of turns that is substantially parallel to the surface of the plate, and the third coil is disposed to be surrounded by the first coil or the second coil.

10. The electronic device of claim 1, wherein the first or second antenna unit comprises a flexible printed circuit board.

11. The electronic device of claim 1, wherein the control circuit further comprises a wireless charging module connected to one of the first coil and the second coil.

12. The electronic device of claim 11, wherein the control circuit further comprises a Near Field Communication (NFC) module comprising NFC circuitry connected to one of the first coil and the second coil, and at least one of the first coil and the second coil being alternately connected with the wireless charging module and the NFC module.

13. The electronic device of claim 11, wherein the control circuit further comprises a Magnetic Secure Transmission (MST) module comprising MST circuitry connected to one of the first coil and the second coil, and at least one of the first coil and the second coil being alternately connected with the wireless charging module and the MST module.

14. An electronic device comprising:
a plurality of antenna units including first and second antenna units, each antenna unit comprising a first coil and a second coil;
a Magnetic Secure Transmission (MST) module comprising MST circuitry connected with the first coil;
a Near Field Communication (NFC) module comprising NFC circuitry connected with the second coil;
a shielding structure comprising a shielding material,
wherein the shielding structure comprises: a first shielding structure disposed above the second antenna unit and disposed at least partially inside the first coil, and a second shielding structure being a different layer from the first shielding structure and disposed below the second coil,
wherein an open space is disposed between the first and second shielding structures, and at least a part of the second antenna unit passes through the open space.

15. The electronic device of claim 14, wherein the plurality of antenna units further comprise a third coil, wherein the third coil is connected with a magnetic induction type (WPC) module and has a plurality of turns that differ from those of the first coil or the second coil and is disposed inside the first coil or the second coil so as to be surrounded thereby,
wherein the antenna unit comprises first and second antenna units and comprise different layers; the first antenna unit being disposed above the second antenna unit; and a plurality of via holes formed on opposite sides of the first antenna unit and spaced apart from and parallel to each other guide the direction of the first coil.

16. The electronic device of claim 15, wherein the first coil and the second coil are arranged in a helical form in orthogonal directions when viewed from above the antenna unit.

* * * * *